US009449417B1

(12) United States Patent
Iben et al.

(10) Patent No.: US 9,449,417 B1
(45) Date of Patent: Sep. 20, 2016

(54) ARTISTIC SIMULATION OF CURLY HAIR

(71) Applicant: Pixar, Emeryville, CA (US)

(72) Inventors: Hayley Iben, Fremont, CA (US); Mark Meyer, San Francisco, CA (US); Lena Petrovic, Union City, CA (US); Olivier Soares, Emeryville, CA (US)

(73) Assignee: PIXAR, Emeryville, CA (US)

( * ) Notice: Subject to any disclaimer, the term of this patent is extended or adjusted under 35 U.S.C. 154(b) by 411 days.

(21) Appl. No.: 13/756,793

(22) Filed: Feb. 1, 2013

Related U.S. Application Data

(60) Provisional application No. 61/594,191, filed on Feb. 2, 2012.

(51) Int. Cl.
*G06T 13/40* (2011.01)

(52) U.S. Cl.
CPC ..................................... *G06T 13/40* (2013.01)

(58) Field of Classification Search
None
See application file for complete search history.

(56) References Cited

U.S. PATENT DOCUMENTS

| 6,720,962 | B1 | 4/2004 | Alter |
| 6,952,218 | B1 | 10/2005 | Bruderlin |
| 8,026,917 | B1 | 9/2011 | Rogers et al. |
| 2004/0080506 | A1 | 4/2004 | Mech |
| 2005/0212800 | A1* | 9/2005 | Petrovic ................. G06T 13/40 345/426 |
| 2007/0030266 | A1 | 2/2007 | Styles |
| 2007/0085851 | A1 | 4/2007 | Muller et al. |
| 2007/0216701 | A1 | 9/2007 | Bruderlin et al. |
| 2007/0270092 | A1 | 11/2007 | Gornowicz |
| 2007/0273705 | A1 | 11/2007 | Bruderlin et al. |
| 2007/0279413 | A1 | 12/2007 | Leveque et al. |
| 2008/0297519 | A1 | 12/2008 | Scapel et al. |
| 2009/0153551 | A1 | 6/2009 | Park et al. |
| 2010/0156902 | A1 | 6/2010 | Kim et al. |
| 2011/0216074 | A1* | 9/2011 | Witkin et al. ................. 345/473 |

OTHER PUBLICATIONS

Andrew Selle, Michael Lentine, and Ronald Fedkiw. 2008. A mass spring model for hair simulation. ACM Trans. Graph. 27, 3, Article 64 (Aug. 2008).*
Chen, A spatial low-pass filter working for triangular irregular network (TIN) and restricted by break lines, 1989.
Notice of Allowance, dated Mar. 27, 2015, for U.S. Appl. No. 12/717,540, 9 pages.

(Continued)

*Primary Examiner* — Carlos Perromat
(74) *Attorney, Agent, or Firm* — Kilpatrick Townsend & Stockton LLP

(57) ABSTRACT

Techniques are disclosed for stably simulating stylized curly hair that address artistic needs and performance demands, both found in the production of feature films. To satisfy the artistic requirement of maintaining a curl's helical shape during motion, a hair model is developed based upon an extensible elastic rod. A method is provided for stably computing a frame along a hair curve for stable simulation of curly hair. The hair model introduces a new type of spring for controlling the bending and twisting of a curl and another for maintaining the helical shape during extension. The disclosed techniques address performance concerns often associated with handling hair-hair contact interactions by efficiently parallelizing the simulation. A novel algorithm is presented for pruning both hair-hair contact pairs and hair particles. The method can be used on a full length feature film and has proven to be robust and stable over a wide range of animated motion and on a variety of hair styles, from straight to wavy to curly.

19 Claims, 17 Drawing Sheets

(56) References Cited

OTHER PUBLICATIONS

Bando, Y., Chen, B.-Y., and Nishita, T. "Animating hair with loosely connected particles", Computer Graphics Forum, (Sep. 2003).vol. 22; No. 3.

Bergou, M., Wardetzky, M., Robinson, S., Audoly, B., and Grinspun, E., "Discrete elastic rods", In ACM SIGGRAPH Papers, (2008), vol. 63; No. 12.

Bergou, M., Audoly, B., Vouga, E., Wardetzky, M., and Grinspun, E., "Discrete viscous threads", In ACM SIGGRAPH papers, (2010), vol. 116: No. 10.

Bertails, F., Audoly, B., Cani, M.-P., Querleux, B., Leroy, F., and Leveque, J.-L., "Super-helices for predicting the dynamics of natural hair", In ACM SIGGRAPH papers, (2006), pp. 1180-1187.

Bertails, F., Hadap, S., Cani, M.-P., Lin, M., Kim, T.-Y., Marschner, S., Ward, K., and Kacic-Alesic , Z., "Realistic hair simulation: animation and rendering", In ACM SIGGRAPH 2008 classes, SIGGRAPH, (May 19, 2008), vol. 89: No. 154.

Chang, J. T., Jin, J., and Yu, Y., "A practical model for hair mutual interactions", In Proc. of the 2002 ACM SIGGRAPH/Eurographics symposium on Computer Animation, pp. 73-80.

Choe, B., Choi, M. G., and Ko, H.-S., "Simulating complex hair with robust collision handling", In Proc. of the 2005 ACM SIGGRAPH/Eurographics symposium on Computer Animation, (Jul. 29-31, 2005), pp. 153-160.

Grégoire, M., and E. Schömer, "Interactive simulation of one-dimensional flexible parts", In Proc. of the 2006 ACM symposium on Solid and Physical Modeling, (Mar. 21, 2007), pp. 95-103.

Gupta, R., Montagnol, M., Volino, P., and Magnenat-Thalmann, N., "Optimized framework for real time hair simulation", In Proc. of Computer Graphics International (CGI 2006), LNCS, pp. 702-710.

McAdams, A., Selle, A., Ward, K., Sifakis, E., and Teran, J., "Detail preserving continuum simulation of straight hair", In ACM SIGGRAPH papers, (2009), 62:1-62:6.

Pai, D. K., "Strands: Interactive simulation of thin solids using cosserat models", Computer Graphics Forum (Sept.), vol. 21; No. 3, pp. 347-352.

Petrovic, L., Henne, M., and Anderson, J., "Volumetric methods for simulation and rendering of hair", Technical Memo 06-08, (2005), Pixar Animation Studios, 6 pages.

Plante, E., Cani, M.-P., and Poulin, P., "Capturing the complexity of hair motion", Graphical Models, (Jan. 2002), vol. 64, No. 1, pp. 40-58.

Rosenblum, R., Carlson, W. E., and Tripp III, E., "Simulating the structure and dynamics of human hair: Modelling, rendering and animation", The Journal of Visualization and Computer Animation, (Jun. 1991), vol. 2, pp. 141-148.

Spillmann, J., and Teschner, M., "CoRdE: Cosserat rod elements for the Dynamic Simulation of One-Dimensional elastic objects", In Proc. of the 2007 ACM SIGGRAPH/Eurographics symposium on Computer Animation, (2007), pp. 63-72.

Teschner, M., Heidelberger, B., Mueller, M., Pomeranets, D., and Gross, M., "Optimized spatial hashing for collision detection of deformable objects", In Vision, Modeling and Visualization, (Nov. 19-21, 2003), 47-54.

Ward, K., Bertails, F., Kim, T.-Y., Marschner, S. R., Cani, M.-P., and Lin, M. C., "A survey on hair modeling: Styling, simulation, and rendering", IEEE Transactions on Visualization and Computer Graphics, (Mar. 2007), vol. 13: No. 2, pp. 213-234.

\* cited by examiner

| Symbol | MODEL_1 | MODEL_2 |
|---|---|---|
| $k_s$ | $5 \times 10^6 - 1 \times 10^7$ | $3 \times 10^5$ |
| $c_s$ | $4472 - 4743$ | $6025$ |
| $\alpha_t$ | $10$ | $0 - 1$ |
| $k_t$ | $100 - 7.2 \times 10^4$ | $300 - 4.7 \times 10^4$ |
| $c_t$ | $40 - 2495$ | $22 - 1083$ |
| $\alpha_c$ | $3$ | $0$ |
| $k_c$ | $1.5 \times 10^4 - 6 \times 10^5$ | $0$ |
| $c_c$ | $100 - 1.0 \times 10^4$ | $0$ |
| $r_i$ | $0.23 - 1.65$ | $1.0 - 2.5$ |
| $r_c$ | $5$ | $3 - 4$ |
| $n_t$ | $1$ | $3 - 20$ |

FIG. 12

| Model | Hairs | Points | Number of Processors | | | | | | |
|---|---|---|---|---|---|---|---|---|---|
| | | | 1 | 2 | 4 | 6 | 8 | 10 | 12 |
| MODEL_1 | 579 | 44,552 | 98.9 | 50.5 | 28.9 | 20.9 | 17.3 | 16.6 | 13.4 |
| MODEL_2 (TOTAL) | 9700 | 117,607 | 125.45 | 72.0 | 47.0 | 39.2 | 27.6 | 25.3 | 23.2 |
| MODEL_2 (PART_A) | 2604 | 43,591 | 41.2 | 26.3 | 19.1 | 16.9 | 8.9 | 9.0 | 6.9 |
| MODEL_2 (PART_B) | 425 | 18,275 | 40.8 | 22.6 | 14.7 | 12.1 | 10.1 | 8.8 | 9.0 |
| MODEL_2 (PART_C) | 996 | 17,928 | 14.6 | 7.9 | 4.4 | 3.4 | 2.8 | 2.4 | 2.3 |
| MODEL_2 (PART_D) | 726 | 13,068 | 9.95 | 5.4 | 3.2 | 2.6 | 2.2 | 1.9 | 2.0 |
| MODEL_2 (PART_E) | 4,949 | 24,745 | 18.9 | 9.8 | 5.6 | 4.2 | 3.6 | 3.2 | 3.0 |

FIG. 13

ARTISTIC SIMULATION OF CURLY HAIR

CROSS-REFERENCE TO RELATED APPLICATIONS

This application claims priority to U.S. Provisional Patent Application No. 61/594,191, filed Feb. 2, 2012 and entitled "Artistic Simulation of Curly Hair," which is herein incorporated by reference in its entirety for all purposes. This Application is related to U.S. patent application Ser. No. 12/717,530, filed Mar. 4, 2010 and entitled "Reorienting Properties of in Hair Dynamics" and to U.S. patent application Ser. No. 12/717,540, filed Mar. 4, 2010 and entitled "Scape Separation in Hair Dynamics," which are herein incorporated by reference in their entirety for all purposes.

BACKGROUND

This disclosure relates to computer-generated imagery (CGI) and computer-aided animation. More specifically, this disclosure relates to techniques for artistic simulation of curly hair for use in CGI and computer-aided animation.

With the widespread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Objects can be sculpted much like real clay or plaster, working from general forms to specific details, for example, with various sculpting tools. Models may then be constructed, for example, out of geometrical vertices, faces, and edges in a 3D coordinate system to represent the objects. These virtual models can then be manipulated using computers to, for example, simulate physics, design aesthetic actions such as poses or other deformations, crate lighting, coloring and paint, or the like, of characters or other elements of a computer animation display.

Pixar is one of the pioneering companies in the computer-generated imagery (CGI) and computer-aided animation industry. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), and others. In addition to creating animated features, Pixar develops computing platforms and tools specially designed for computer-aided animation and CGI. One such example is now known as PhotoRealistic RenderMan, or PRMan for short. PRMan is a photorealistic RenderMan-compliant rendering software system based on the RenderMan Interface Specification (RISpec) which is Pixar's technical specification for a standard communications protocol (or interface) between 3D computer graphics programs and rendering programs. PRMan is produced by Pixar and used to render their in-house 3D animated movie productions. It is also available as a commercial product licensed to third parties, sold as part of a bundle called RenderMan Pro Server, a RenderMan-compliant rendering software system developed by Pixar based on their own interface specification. Other examples include tools and plug-ins for programs such as the AUTODESK MAYA high-end 3D computer graphics software package from AutoDesk, Inc. of San Rafael, Calif.

One core functional aspect of PRMan can include the use of a "rendering engine" to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects to be used in the rendered image or animation sequence, such as characters, props, background, or the like. In some instances, the geometric description of the objects may include a number of animation control variables (avars) and values for the avars. An animator may also pose the objects within the image or sequence and specify motions and positions of the objects over time to create an animation.

As such, the production of CGI and computer-aided animation may involve the extensive use of various computer graphics techniques to produce a visually appealing image from the geometric description of an object that may be used to convey an essential element of a story or provide a desired special effect. One of the challenges in creating these visually appealing images can be the balancing of a desire for a highly-detailed image of a character or other object with the practical issues involved in allocating the resources (both human and computational) required to produce those visually appealing images.

Accordingly, what is desired is to solve one or more of the problems relating to simulating curly hair for use in CGI and computer-aided animation, some of which may be discussed herein. Additionally, what is desired is to reduce some of the drawbacks relating to simulating curly hair for use in CGI and computer-aided animation, some of which may be discussed herein.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Techniques are disclosed for stably simulating stylized curly hair that address artistic needs and performance demands, both found in the production of feature films. To satisfy the artistic requirement of maintaining a curl's helical shape during motion, a hair model is developed based upon an extensible elastic rod. A method is provided for stably computing a frame along a hair curve for stable simulation of curly hair. The hair model introduces a new type of spring for controlling the bending and twisting of a curl and another for maintaining the helical shape during extension. The disclosed techniques address performance concerns often associated with handling hair-hair contact interactions by efficiently parallelizing the simulation. A novel algorithm is presented for pruning both hair-hair contact pairs and hair particles. The method can be used on a full length feature film and has proven to be robust and stable over a wide range of animated motion and on a variety of hair styles, from straight to wavy to curly.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 12 is a table of examples of the default parameters for Model_1 and Model_2 characters in one or more simulations.

FIG. 13 is a table of examples of the results for Model_1 and Model_2 characters in one or more simulations.

DETAILED DESCRIPTION

Introduction

Robustly simulating stylized hair in a production environment is a challenging problem. Hair styles can range from straight to curly and often consist of an enormous number of hair-hair interactions, leading to performance and memory concerns. In an environment driven by artistic expression, such as feature films, the shape and motion of the hairs resulting from the simulator are critical, as is the overall simulation time.

A hair model is disclosed designed for creating specific visual looks of curly hair, such as adding bounce during a walk cycle by allowing hair to stretch. Artists typically want to preserve the helical curl shape after extension, however, with infinitesimally thin rods, the helix distorts after extension (see [Bergou et al. 2008]) which is an undesired behavior. Yet, the proposed hair model is robust and stable, able to handle fairly arbitrary hair shapes. Given the large range of motion present in an animated feature film, a simulator must be able to give dependable results while preserving the overall look of the hair.

Given these requirements, in various embodiments, hair can be represented as a mass-spring system defined by a piecewise linear curve that captures the deformation of the hair over time. Using a point representation for the hair gives artists an intuitive interface to define and modify its structure, as well as easily incorporate animation controls and external forces. In addition to one or more linear springs connecting particles, at least one spring is introduced in some embodiments for controlling the bending and twisting along the curve and another at least one spring is introduced for controlling the longitudinal stretch of the curls, designed to provide artists with the desired visual look. Because simulating stylized curly hair is one primary concern, a novel algorithm is proposed for computing a stable frame along the hair curve to retain the helical shape during motion. While specifically designed for simulating curly hair, the method can further handle a wide range of hair styles. Additionally, this disclosure is applicable to other 1-D or curve model representations, such as for tails, vines, ropes, or the like.

In further embodiments, instead of simulating a dense number of hairs, a hair model is proposed that uses a predetermined number of guide hairs, each representing multiple hairs that are to be rendered. Even with a reduction of hair complexity, simulating every hair-hair contact can still be expensive on models with a large number of complex hairs. Instead, a novel algorithm is proposed for pruning the number of contacts considered by each hair, improving performance and reducing memory usage. By using this pruning, performance can be improved through parallelism. Without parallelization, it would be more difficult to meet production needs for efficiently simulating a wide range of characters.

Figure 1:
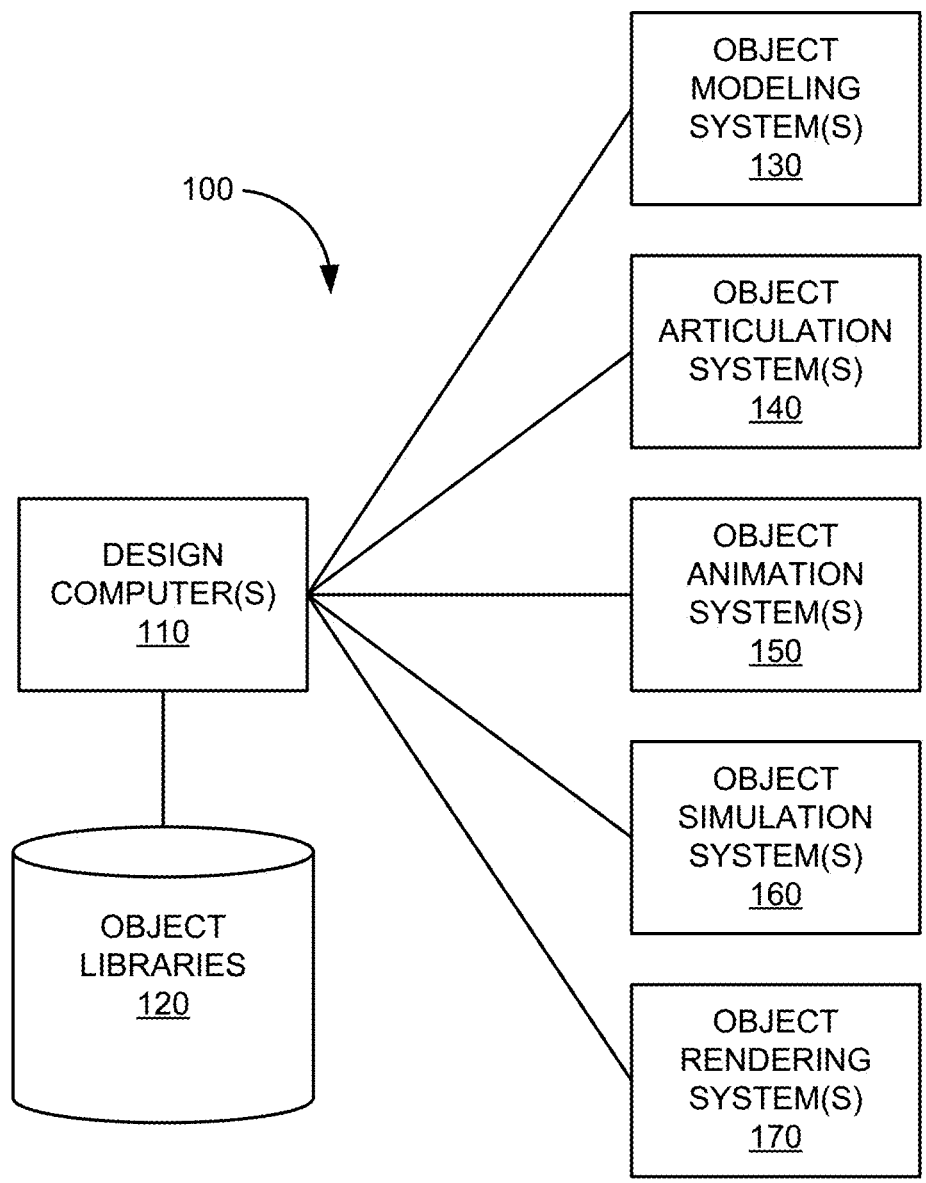
FIG. 1 is a simplified block diagram of a system for creating computer graphics imagery (CGI) and computer-aided animation that may implement or incorporate various embodiments or techniques for artistic simulation of curly hair.

FIG. 1 is a simplified block diagram of system 100 for creating computer graphics imagery (CGI) and computer-aided animation that may implement or incorporate various embodiments or techniques for artistic simulation of curly hair. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX® and AUTODESK MAYA® produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX® and AUTODESK MAYA® produced by Autodesk, Inc. of San Rafael, Calif.

In various embodiments, the one or more articulation systems 140 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX® and AUTODESK MAYA® produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX® and AUTODESK MAYA® produced by Autodesk, Inc. of San Rafael, Calif.

In various embodiments, the one or more object simulation systems 160 may be configured to enable users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PHOTOREALISTIC RENDERMAN®, or PRMAN®, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image.

In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170 that provide one or more tools for artistic simulation of curly hair.

Accordingly, in one embodiment, system 100 may include a mass-spring system with novel additions to the hair model and hair-hair contact handling so that system 100 can robustly simulate a variety of hair styles and motion. System 100 may specifically incorporate novel components for simulating stylized curly hair into a force model. In a further embodiment, system 100 may include a novel torsion spring formulation using reference vectors posed in frames computed on a smoothed hair representation. In a still further embodiment, system 100 may include a nonlinear core spring formulation for maintaining curly hair shape during fast motion. In yet a further embodiment, system 100 may implement an algorithm for pruning both hair-hair contact pairs and hair particles to efficiently parallelize hair-hair contact computation.

Related Work

Many researchers have developed methods for modeling, dynamics, and rendering of hair in computer graphics, too numerous to adequately describe here. Instead, some of the most relevant work to the disclosed techniques is touched upon as well as a reference to the survey by Ward et al. [2007] and the class notes of Bertails et al. [2008] for a broad overview.

Many methods have modeled single elastic rods based on Cosserat theory [Pai 2002; Grégoire and Schömer 2006]. Bertails et al. [2006] extended the Kirchhoff model to hair, modeling curls with a piecewise helical structure. This model contains an implicit centerline, complicating constraint handling such as hair-hair and hair-object collisions. Subsequent methods were developed with explicit centerlines for Cosserat [Spillmann and Teschner 2007] and Kirchhoff [Bergou et al. 2008; Bergou et al. 2010] models. These rod methods define material coordinate frames along the hair curve.

In various embodiments, with an explicit hair representation, various embodiments use the parallel transport of the Bishop frame from [Bergou et al. 2008] to stably generate a frame. However, this frame is computed along a smoothed representation of the hair curve instead of the curve itself, reducing the sensitivity of the frame to changes in hair positions.

Much previous work has applied mass-spring systems to individual hairs. One of the first approaches was Rosenblum et al. [1991], which used a linear spring for stretch and an angular spring between segments for bend. Petrovic et at. [2005] used a mass-spring system for simulating the dynamics of keyhairs that represent multiple rendered hairs. Selle et al. [2008] presented a mass-spring model for simulating all individual hairs. They used separate edge, bend, twist, and altitude springs to form an implied tetrahedron of springs between points, preventing volume collapse.

In various embodiments, similar to these methods, a linear spring can be used for stretch. The disclosed hair model differs, however, with the usage of two additional springs, designed to give artists the desired visual look. A single spring can be added for controlling both the bend and twist, using the stably generated frame discussed above for the hair orientation. An additional spring can be defined to control the longitudinal stretch of curls during motion, not present in prior models.

Other papers have combined mass-spring systems with additional methods, often for the purpose of detecting hair-hair contacts and defining hair volume. [Plante et al. 2002] constrained a mass-spring system to a deformable envelope defining a volume of the cluster of hairs (wisp), which was also used for wisp-wisp interactions. Bando et al. [2003] model the hair as a set of particles with density representing the sampled hair volume. Choe et al. [2005] combined a mass-spring model with a serial rigid multibody chain to model wisps, detecting contacts through cylinders. Mass-spring models have also been combined with a lattice for deformation during hair styling [Gupta et al. 2006] or with an Eulerian fluid solver to give volume and provide a better initial position for the particle contacts [McAdams et al. 2009].

In various embodiments, similar to prior work, contacts are detected by surrounding particles with geometry to preserve volume, such as spheres, and use penalty forces to handle interactions. One difference is that an algorithm is used to prune both hair-hair pairs and hair particles to improve performance while still producing good results.

Simulation of Hair

Figure 2:
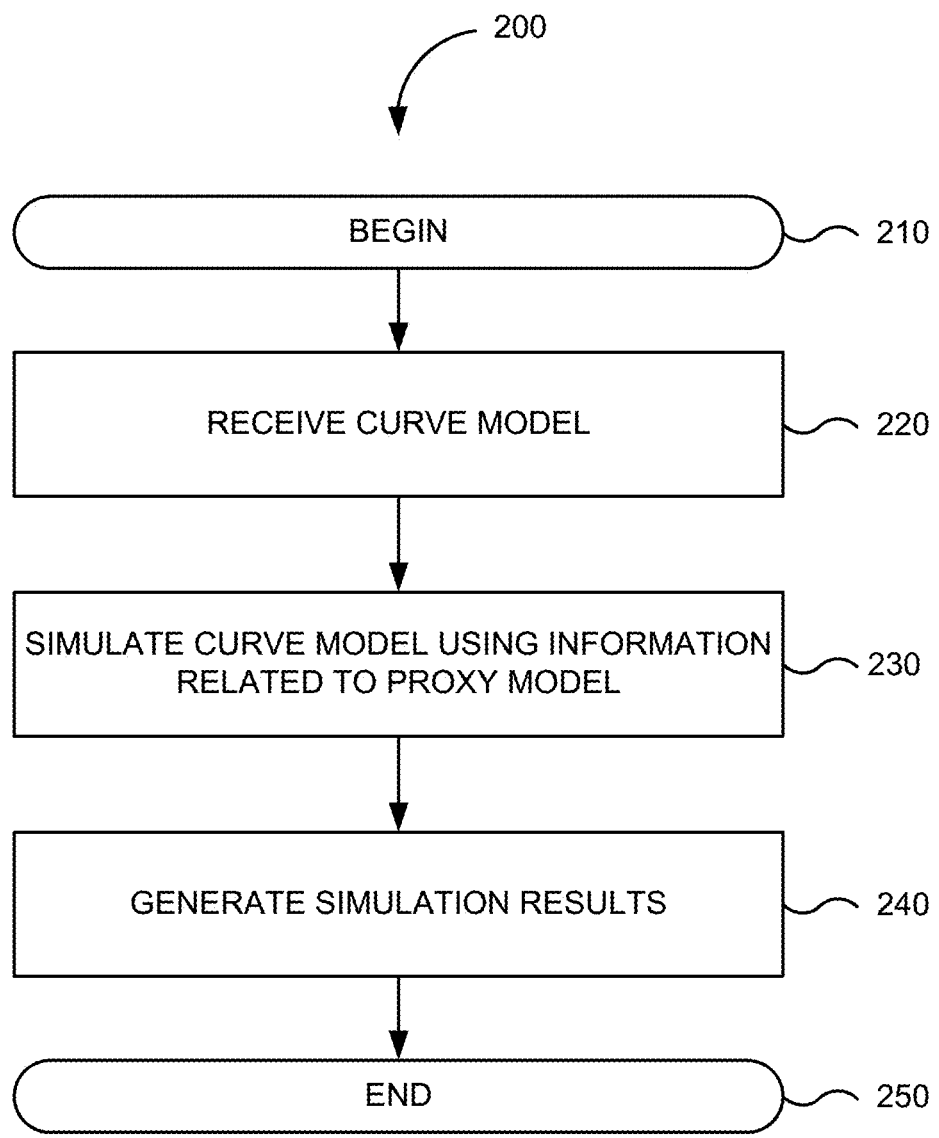
FIG. 2 is a simplified flowchart of a method for simulating a curve model using information related to a proxy model in various embodiments.

FIG. 2 is a simplified flowchart of method 300 simulating a curve model using information related to a proxy model in various embodiments. The processing of method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 begins in step 210.

In step 220, a curve model is received. For example, a user of design computer 110 may utilize the one or more object modeling systems 130 to create or sculpt a curve model. Information specifying or defining the curve model may be provided by the user of design computer 110 of FIG. 1 or derived programmatically. The curve model may include information defining the geometric description of a curve, topological information, control points, animation variables (avars), physical properties, material properties, lighting properties, or the like. The curve model may also be associated with pose information, animation cues, or the like. For example, a modeler using design computer 110 may define a rest pose for the curve model. The rest pose may be used to determine a shape or style all or part of the curve model seeks to maintain in light of a simulation. In another example, an animator using design computer 110 may define various additional poses for the curve model. The various additional poses can be specified according to a desired position of one or more control vertices over time that can be used to create an animation of the curve model.

In step 230, the curve model is simulated using information related to a proxy model. For example, a user of design computer 110 may utilize the one or more object simulation systems 160 to simulate the curve model, one or more poses thereof of the curve model, one or more proxy models representing simplified or filtered versions of the curve model, or one or more poses thereof of the one or more proxy models. The one or more object simulation systems 160 may simulate behavior and/or response of the curve model or proxy model based on properties defining shape and other internal forces and external forces (e.g., gravity, wind, or collisions). The one or more object simulation systems 160 may also simulate behavior of or collision thereto of additional models.

Therefore, behavior and/or response of a curve model during a simulation may require information from the structure of the curve model. The structure of a curve model typically can provide its shape and include other material properties in addition to information from which a reference frame can be constructed. Local coordinate frames then may be provided along the length of a curve model that may be used for any hair deformation or for interaction responses, such as from physical forces, hair-to-hair or hair-to-body collisions, or the like. In one example, starting at a root vertex of a curve model, a local coordinate frame can be computed with a coordinate frame fixed with respect to the object to which root vertex is attached. The X-axis may be determined to be along the hair direction. This coordinate frame can then be propagated along the curve model between successive control vertices. Thus, a suitable local coordinate frame may be determined at each desired points along the curve model, such as at each of the control vertices. These local coordinate frames may be used, in essence, to account for any change in direction between two consecutive vertices due to properties or parameters of the curve model, such as mechanical and physical properties of a hair represented by the curve model that provide its shape and/or groom and certain behaviors of the hair.

However, dynamic or simulation models, such as complex hair styles or hair exhibiting complex physical properties such as long curly hair, may require a large number of control vertices to provide a desired structure, shape, and/or groom. As a result of having a large number of control vertices or large datasets to represent the complex material or physical properties of curly hair, it may become computationally prohibitive to use an approach of propagating information along a curve between successive control vertices to determine local coordinate frames. Additionally, it may become potentially numerically unstable to manage the large datasets in production systems.

Accordingly, in various embodiments, information related to a proxy model may be used. For example, rendering and/or simulation of a complex curly hair model may be provided with stable reference frames for determining response. In one embodiment, a proxy version of a curve model may be used as a reference during the actual simulation of the curve model as outlined in method 200 of FIG. 2. Simplified can be understood to mean that one or more features or complexities have been removed or filtered or that resolution of a model has been reduced. The simplified version of a dynamic or simulation model may be referred to as a proxy model.

In step 240, simulation results are generated. For example, the one or more object simulation systems 160 may generate simulation data based on dynamics associated with a curve model. These dynamics may include material and physical properties associated with the curve model, properties representing forces that move a pose of the curve model toward a rest pose of the curve model, or the like. These dynamics may further include a groom or hairstyle properties. The one or more object simulation systems 160 may generate simulation data based an expected behavior of the curve model in response to additional influences, such as those represented by forces (e.g., gravity or wind) and collisions (e.g., with itself or other objects).

The one or more object simulation systems 160 may also generate the simulation data based on interpolating between different poses of the curve model and accounting for application of the above-described forces. FIG. 2 ends in step 250.

Artistic Simulation with Stretch Spring

In various embodiments, hair is modeled as a infinitesimally thin rod, similar to the model discussed in [Bergou et al. 2008]. For example, a single hair may be represented by a piecewise linear curve and a material frame calculated for each point. A force model can be envisioned to satisfy three properties to create the desired visual looks. First, hair rods should be relatively extendable, allowing artistic control over stretch. Second, the hair model should maintain a curl's shape without excessive twisting after a curl is stretched. Last, curls should reasonably maintain their initial shape during motion, avoiding curl unwinding.

These properties can be modeled for a single hair by using a mass-spring system. Similar to [Rosenblum et al. 1991; Petrovic et al. 2005; Selle et al. 2008; McAdams et al. 2009], each hair particle can be sequentially connected with a linear spring, controlling stretch. One difference from prior work is the formulation of two additional springs. To control bend and twist along the curl, a novel torsion spring is proposed by computing frames along a smoothed representation of the curve. A spring is also introduced limiting the longitudinal stretch of curls. These three springs comprise a per hair force model.

In some embodiments, a curve model is defined using a set of particle positions connected by linear springs. For example, let each curve model representing a hair be defined by a set of current particle positions $P=\{p_0, \ldots, p_{N-1}\}$ and initial rest pose particles, $\bar{P}$, where $\bar{\cdot}$ denotes rest quantities. Let the current velocities for these particles be $V=\{v_0, \ldots, v_{N-1}\}$ and the polyline edges connecting hair particles be $e_i=p_{i+1}-p_i$. A standard linear spring force can be computed on particle i by using equation (1):

$$f_s(k_s,c_s)_i = k_s(\|e_i\|-\|\bar{e}_i\|)\hat{e}_i + c_s(\Delta v_i \cdot \hat{e}_i)\hat{e}_i \tag{1}$$

where $k_s$ are the spring and $c_s$ the damping coefficients, $\Delta v_i = v_{i+1} - v_i, \|\cdot\|$ denotes vector length and $\hat{\cdot}$ vector normalization. Because springs are connecting two particles, each force is applied to both particles in opposite directions To allow artistic stretch of the hair without using stiff springs, an upper limit is imposed on the stretch of the polyline similar to the biased strain limiting approach presented in [Selle et al. 2008]. During the spring damping calculation, the velocity of the hair particle is limited by recursing from the root to the tip if $\Delta v_i^2$ exceeds a threshold. After positions are updated, the hair is again recursed from the root of the hair to the tip shortening edges that exceed the specified stretch allowance. By using this limiter, artists are able to control the desired amount of stretch allowed by the system.

Artistic Simulation with Torsion Springs

Figure 3:
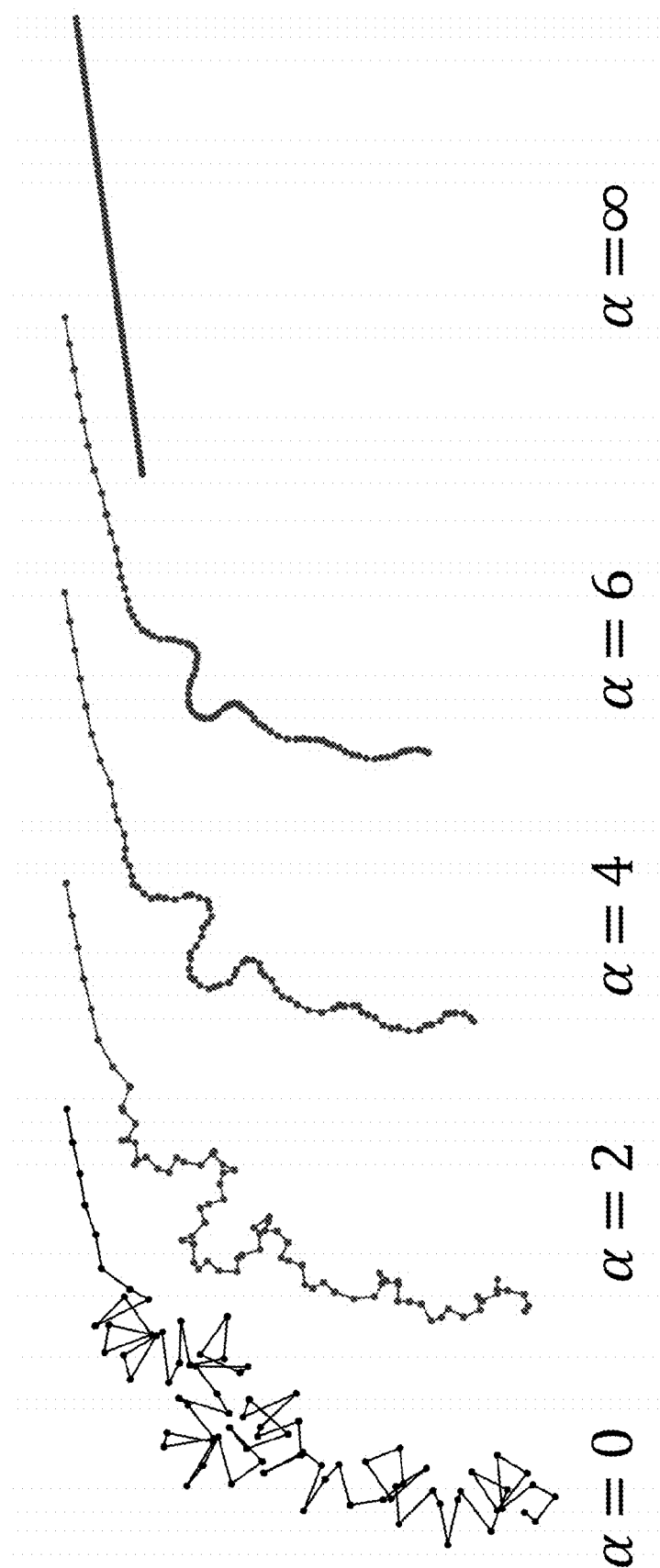
FIG. 3 is an illustration of one example of a stylized curly hair (far left) and the smoothed curves computed with different sampling rates.
Figure 4A:
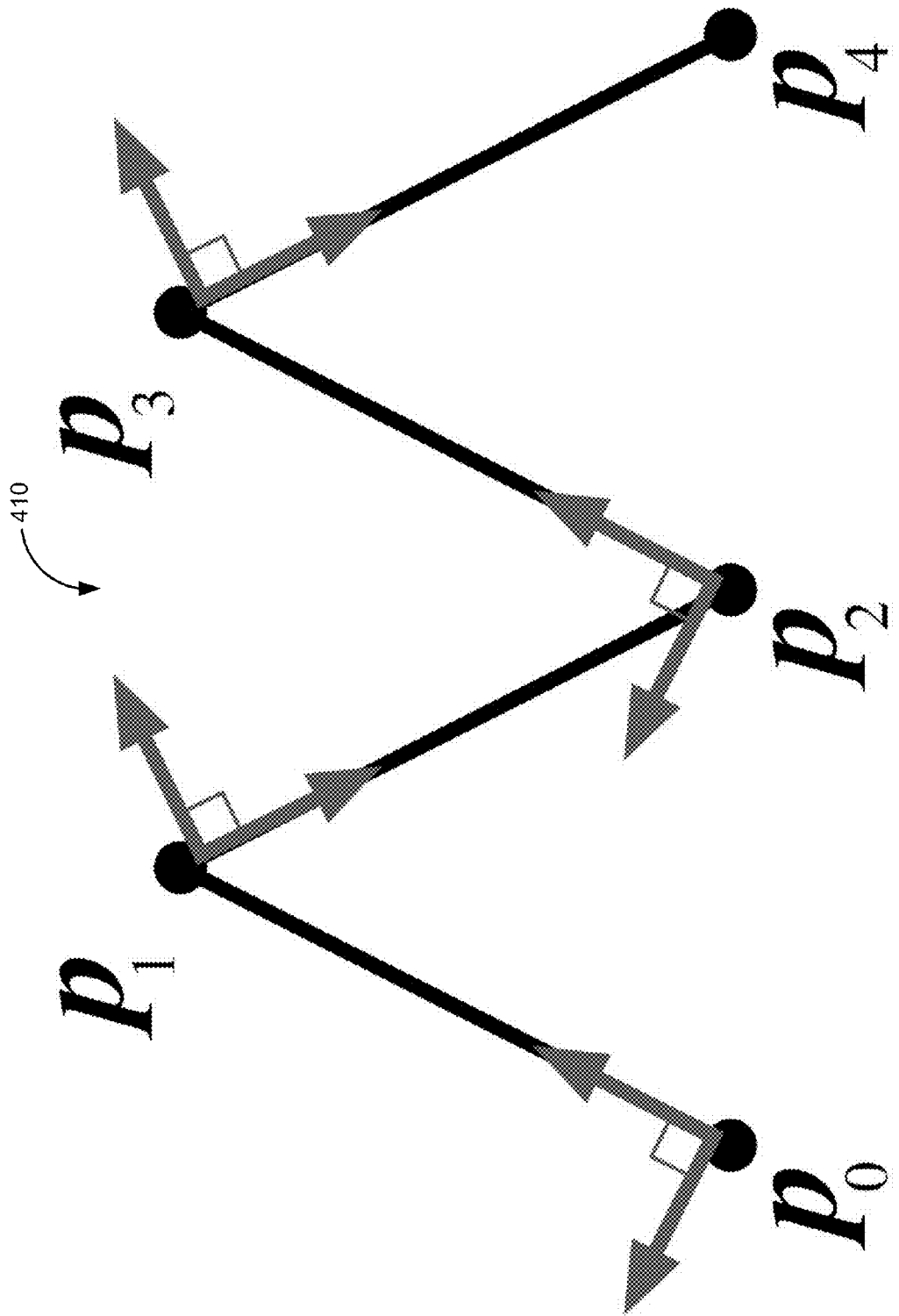
FIGS. 4A and 4B are illustrations depicting reductions in rotation between frames.
Figure 4B:
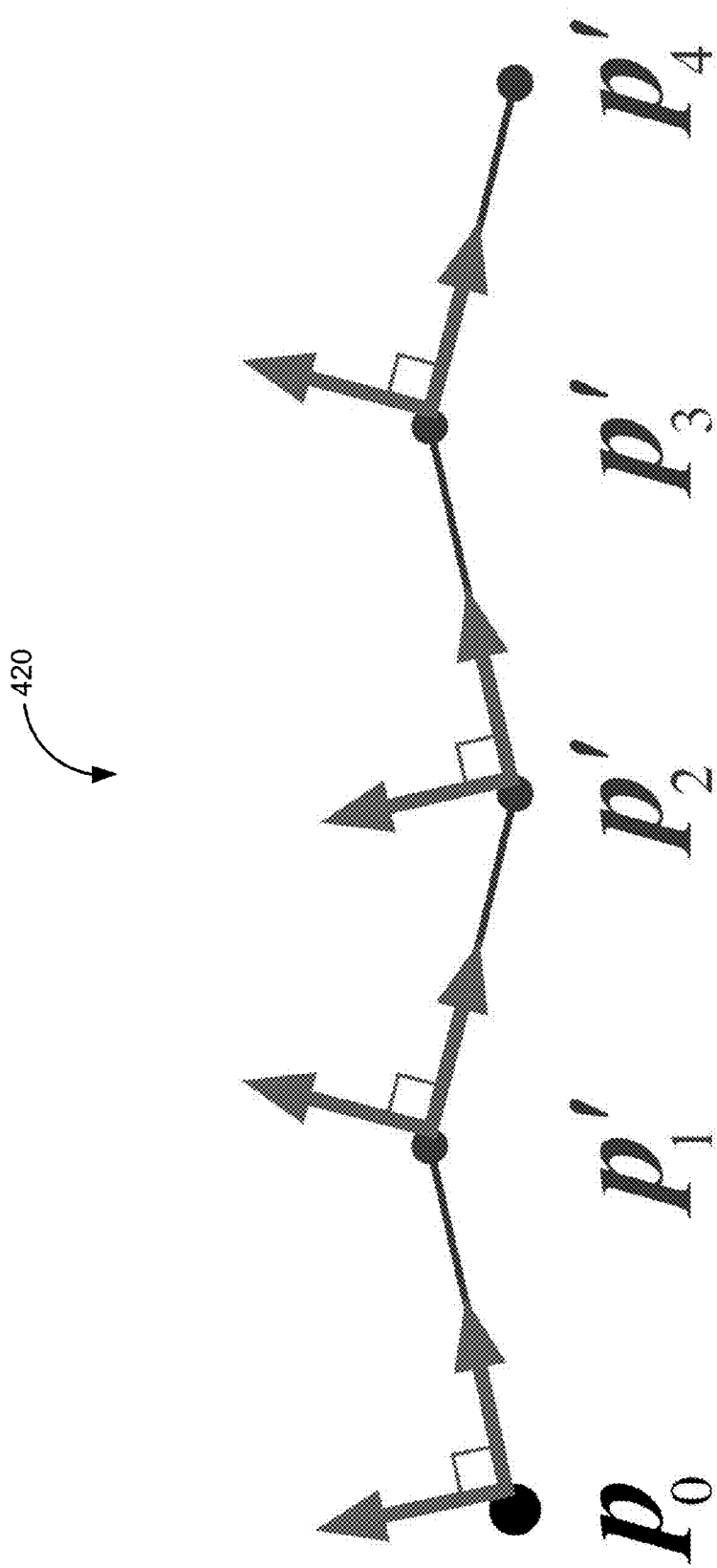

As discussed above, a simulation must be stable and robust to simulate arbitrary piecewise linear curves created by artists. FIG. 3 is an illustration of one example of a curve model representing a stylized curly hair (far left) and a series of smoothed curves computed with different sampling rates from the curve model. For efficiency, a curve's sampling rate can be limited, resulting in input that may be severely kinked for stylized curly hairs. Such hairs potentially contain large twist between neighboring polyline segments. FIGS. 4A and 4B are illustrations depicting reductions in rotation between frames. FIG. 4A is a simple example of a kinked curve 410 with the natural Bishop frame, illustrating large rotations between neighboring samples. FIG. 4B is a simple example of, in various embodiments, a smoothed representation 420 of the curve 410 to reduce rotation between frames.

Frames at control vertices can be sensitive to particle positions because small positional changes can cause large increases in twist between frames. If the original frames were directly used for stylized hairs, the resulting simulation would jitter. In various embodiments, a frame can be stably generated along the curve model. One common approach is for rooting a curve model representing a hair to a planar polygon representing a scalp, which provides the animated motion for the hair and the hair's root coordinate frame, $F_0$. This differs from prior work such as [Bergou et al. 2008; Bergou et al. 2010] because the root frame is transported parallely along a smoothed piecewise linear curve of an original curve instead of the original curve, as illustrated by FIG. 4B. The result is a series of frames that are not highly influenced by small changes in poorly shaped hairs. As discussed further below, a torsion formulation uses reference vectors posed in the frames from the smooth curve to compute the forces or influences on the original curve.

Smoothing Function

Let $\Lambda = \{\lambda_0, \ldots, \lambda_{N-1}\}$ be a set of N elements in $R^3$ associated with a hair, such as particle positions or velocities. A smoothing function is defined such as $d_i = \zeta(\Lambda, \alpha)_i$, with an infinite impulse response (IIR) Bessel filter (for examples, see [Najim 2006]). These filters are recursive functions, combining the input and prior results to produce each new result.

To compute the results, the smoothing amount $\alpha \geq 0$ is taken as input in units of length along the curve. Let $\beta = \min(1, 1 - \exp(-l/\alpha))$ where l is the average rest length per segment of the hair being smoothed. Vectors $d_i \forall_i \in [0 \ldots N-2]$ can then be recusivly computed with the equation (2):

$$d_i = 2(1-\beta)d_{i-1} - (1-\beta)^2 d_{i-2} + \beta^2(\lambda_{i+1} - \lambda_i). \quad (2)$$

By choosing appropriate coefficients and initializing $d_{-2} = d_{-1} = \lambda_1 - \lambda_0$, equation (2) reduces to $d_0 = \lambda_1 - \lambda_0$ at i=0. Subsequent $d_i$ values are weighted towards this initial direction.

Figure 5:
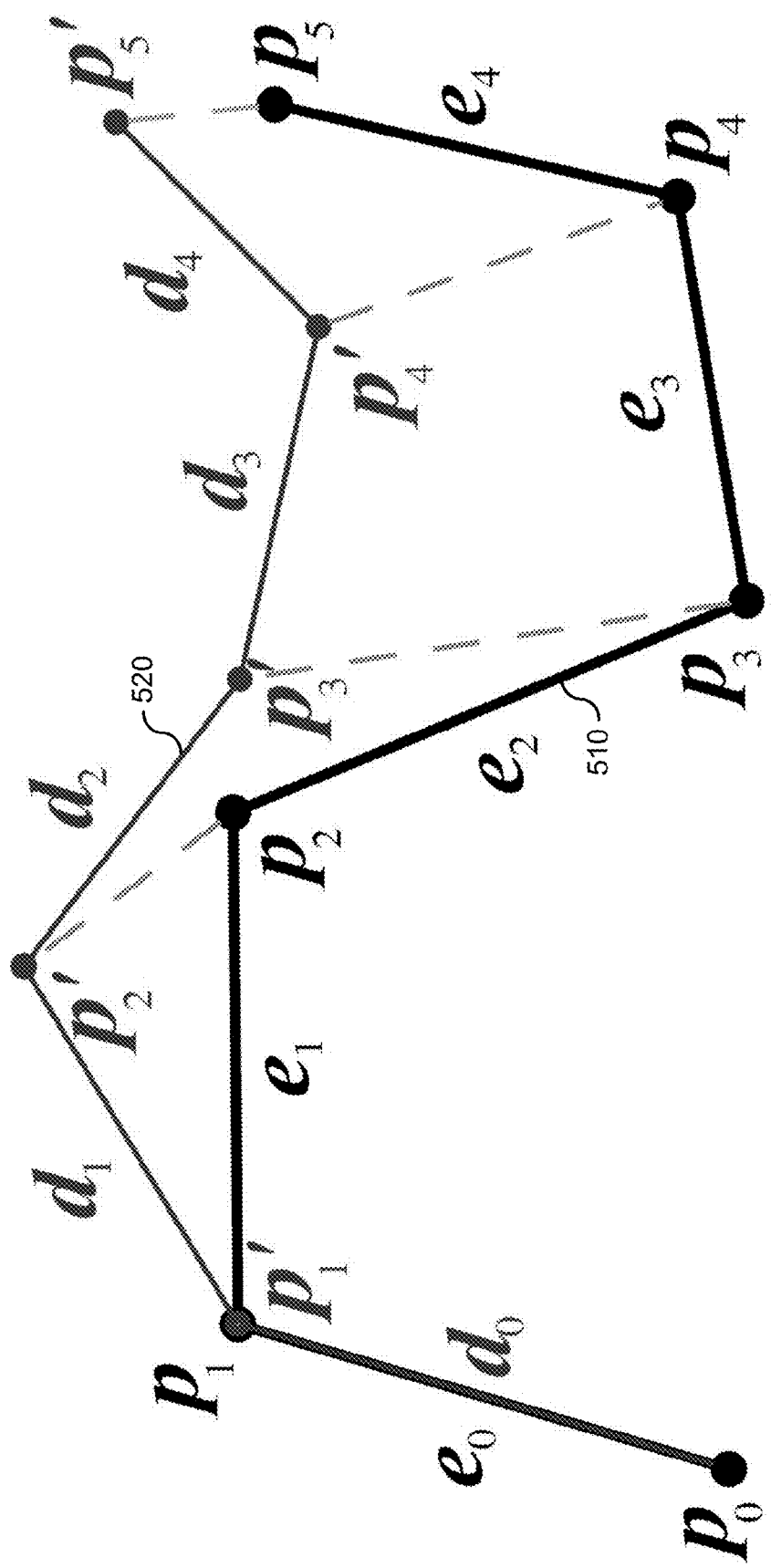
FIG. 5 is an illustration depicting a relationship between an original curve (the thick curve) and a smoothed curve (the thinner curve).

When $\Lambda$ is a set of positions, the smoothed polyline can be reconstructed by recursively adding the vectors from the fixed root position. The new points $p_i' \forall_i \in [1 \ldots N-1]$ are defined by equation (3):

$$p_i' = p_{i-1}' + d_{i-1} \quad (3)$$

where $p'_0 = \lambda_0$, the root of the polyline. FIG. 5 is an illustration depicting a relationship between an original curve 510 and a smoothed curve 520. Original curve 510 has points $p_i$ and edges $e_i$ overlaid with a corresponding smoothed curve 520 with points and edges defined by vectors $d_i$. The range of input values $\alpha = [0, \infty]$ produces well behaved output from equation (2). If $\alpha = 0$, then $\beta = 1$ is set meaning that $d_i = \lambda_{i+1} - \lambda_i$ and no smoothing occurs. As $\alpha \to \infty$ then $\beta \to 0$ and $d_0 = \ldots = d_{N-2} = \lambda_1 - \lambda_0$. If this limit case occurs when $\Lambda$ is a set of positions, the polyline resulting from equation (3) is straight and in the direction of the first segment, regardless of how kinked the input polyline. FIG. 3, as discussed above, gives an example curve and the resulting smooth curve with different a values.

Torsion Spring Formulation

In various embodiments, a torsion spring force is implemented to stably control the bend and twist between the rest pose and current poses of a curve model while maintaining a helical shape of the curve model. This may be one requirement against the physical nature of infinitesimally thin rods used to model a curve. During initialization, the rest pose points of a curve model are used to precompute a reference vector, $\bar{t}_i = F_i^T \bar{e}_i$, as the edge $\bar{e}_i$ expressed in a local frame, $F_i$. The axes of the frame can be stored as the columns of $F_i$ and $\bar{e}_i$ can be used as a column vector. The local frames, $F_i$, can be computed by parallel transport of the root rest frame, $F_0$, along a smoothed curve defined by $\zeta(P, \alpha_t)$ with $\alpha_t$ torsion smoothing amount.

Figure 6:
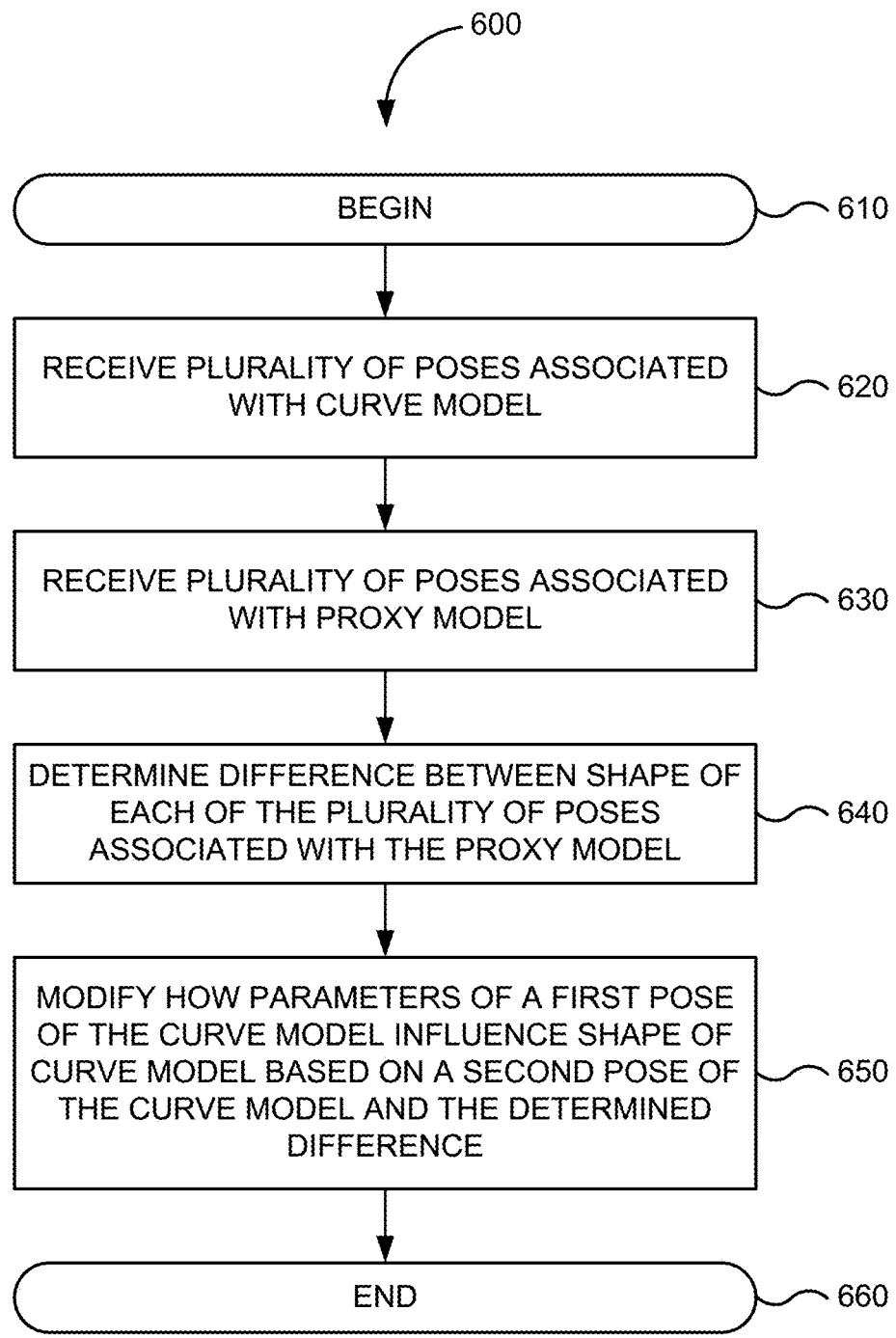
FIG. 6 is a method for controlling bend and twist between poses of a curve model in one embodiment.

FIG. 6 is a method for controlling bend and twist between poses of a curve model in one embodiment. Implementations of or processing in method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 600 depicted in FIG. 6 begins in step 610.

In step 620, a plurality of poses associated with curve model are received. For example, a user of design computer 110 may utilize the one or more object modeling systems 130 to create or sculpt a curve model and pose the curve model in the plurality of poses. Information specifying or defining the curve model may be provided by the user of design computer 110 of FIG. 1 or derived programmatically. The curve model may include information defining the geometric description of a curve, topological information, control points, animation variables (avars), physical properties, material properties, lighting properties, or the like. The curve model may also be associated with pose information, animation cues, or the like. For example, a modeler using design computer 110 may define a rest pose for the curve model as one of the plurality of poses. The rest pose may be used to determine a shape or style all or part of the curve model seeks to maintain in light of a simulation. In another example, an animator using design computer 110 may define various additional poses for the curve model.

In step 630, a plurality of poses associated with a proxy model is received. For example, in one embodiment, a proxy version of the curve model may be used as a reference during an actual simulation of the curve model. The proxy model may include a simplified or filtered version of the curve mode. Simplified can be understood to mean that one or more features or complexities have been removed or that resolution of a model has been reduced.

In step 640, a difference between shape of each of the plurality of poses associated with the proxy model is determined. In step 650, how parameters of a first pose of the curve model influence shape of curve model is modified based on a second pose of the curve model and the determined difference. One example of the above modification is discussed further with respect to FIGS. 7A and 7B. FIG. 6 ends in step 660.

Figure 7A:
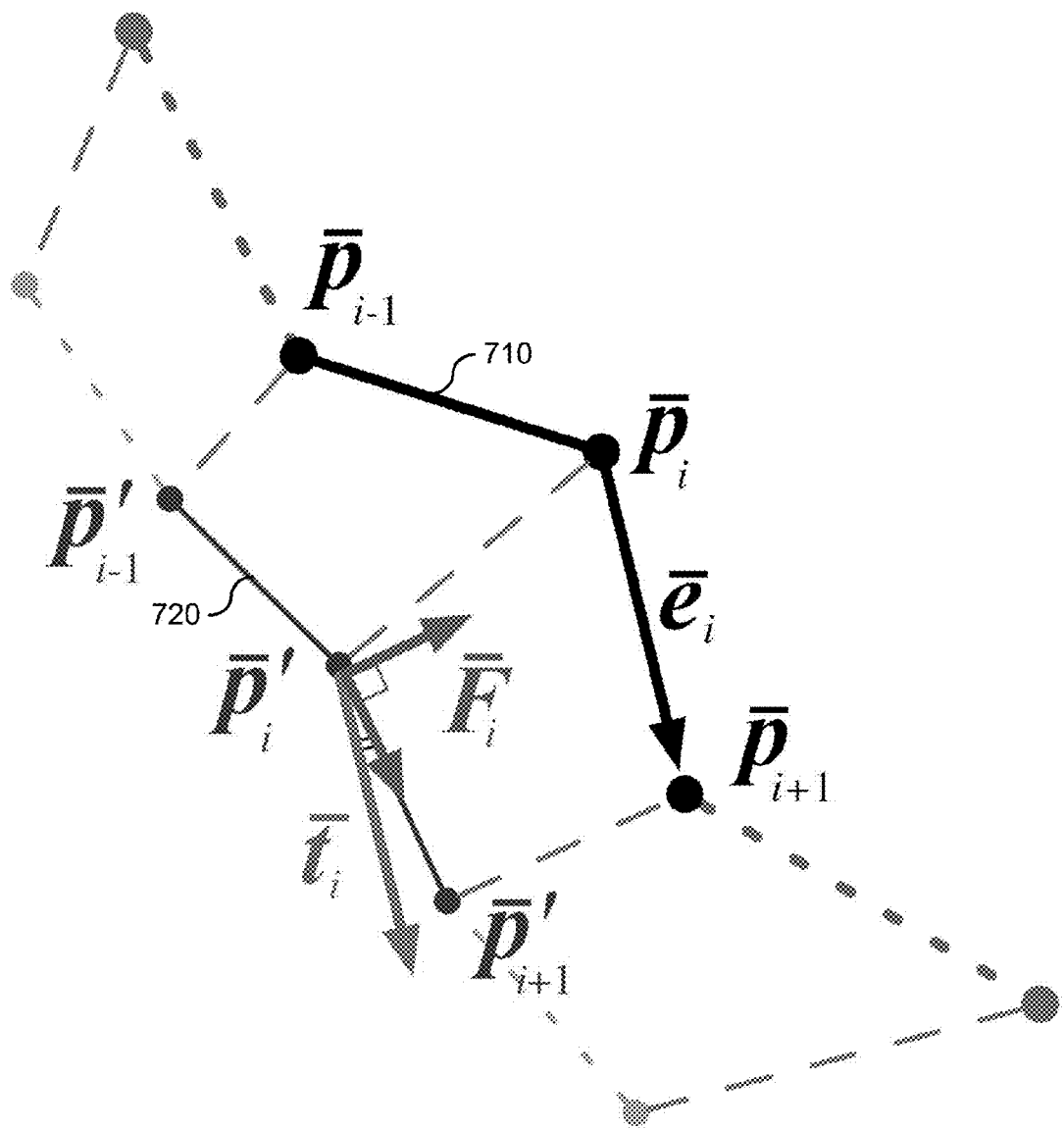
FIGS. 7A and 7B are illustrations depicting a rest curve and a posed curve in one embodiment for computing torsion spring forces.
Figure 7B:
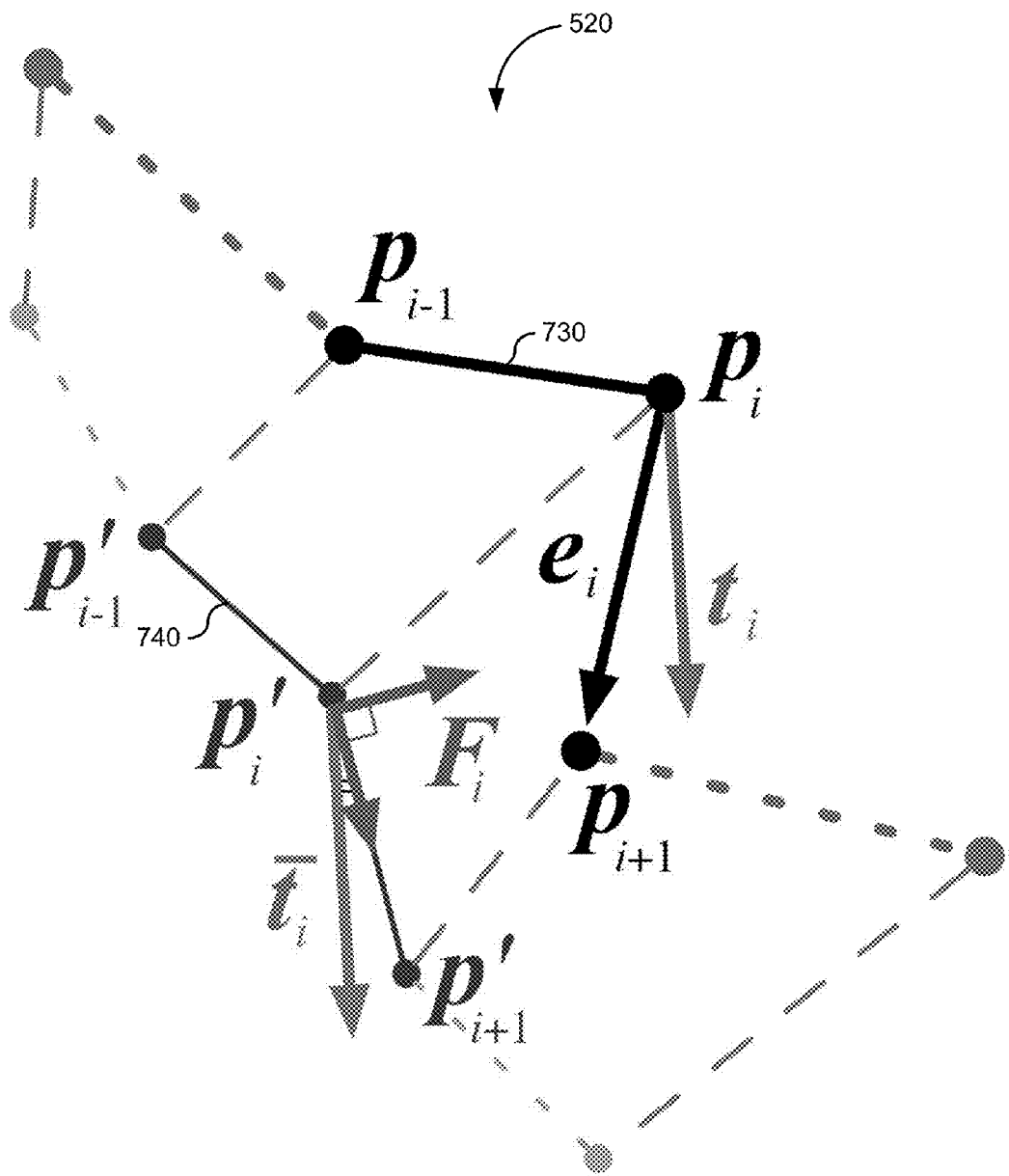

FIGS. 7A and 7B are illustrations depicting rest curve 710 and posed curve 730 in one embodiment. In this example, the rest edge $\bar{e}_i$ in FIG. 7A of rest curve 710 is precomputed and store in local frame $\bar{F}_i$ of smoothed curve 720, giving the reference vector $\bar{t}_i$. In FIG. 7B, local frame $F_i$ of smoothed curve 740 is used to compute t, the target torsion direction, of posed curve 730 from $\bar{t}_i$.

In various embodiments, at each step of a simulation, $F_0$ can be computed from the current root polygon and $F_i$ from $\zeta(P, \alpha_t)$. These local frames are used to stably pose the stored reference vectors $\bar{t}_i$ in the current hair configuration. The resulting vectors are the target vectors, $t_i = F_i \bar{t}_i$, that are desired to match the current pose.

In some embodiments, a spring force may be added between an edge in a current pose, $e_i$, and a target vector, $t_i$, to obtain the torsion force of equation (4):

$$f_t(k_t,c_t)_i = k_t(e_i - t_i) + c_t(\Delta v_i - (\Delta v_i \cdot \hat{e}_i)\hat{e}_i) \quad (4)$$

where $k_t$ is the spring and $c_t$ the damping coefficients. Thus, the added spring force modifies how parameters of the curve model influence its shape in various poses. To allow more flexibility, artists can specify the spring coefficients for each edge. This torsion formulation preserves linear momentum but not angular momentum. However, the model can be readily extended to also preserve angular momentum.

Core Spring

In further embodiments, core springs are provided to modify how parameters of the curve model influence its shape in various poses. For example, using only stretch and torsion springs may be insufficient for artists' needs when simulating curly hair over a variety of motions. A mass-spring model with stiff stretch and torsion springs can hold the curly shape during fast motion, but it reduces the ability for the hair to bend. If, instead, the stiffness of the torsion springs is reduced to allow flexibility, the curls loose shape and unwind at high accelerations. The resulting curl becomes nearly straight and appears much longer than the desired look, even though there is minimal stretch. To allow flexible curly hair yet maintain shape, a third core spring can be introduced that controls the longitudinal stretch of the curls without stiffening torsion.

Figure 8A:
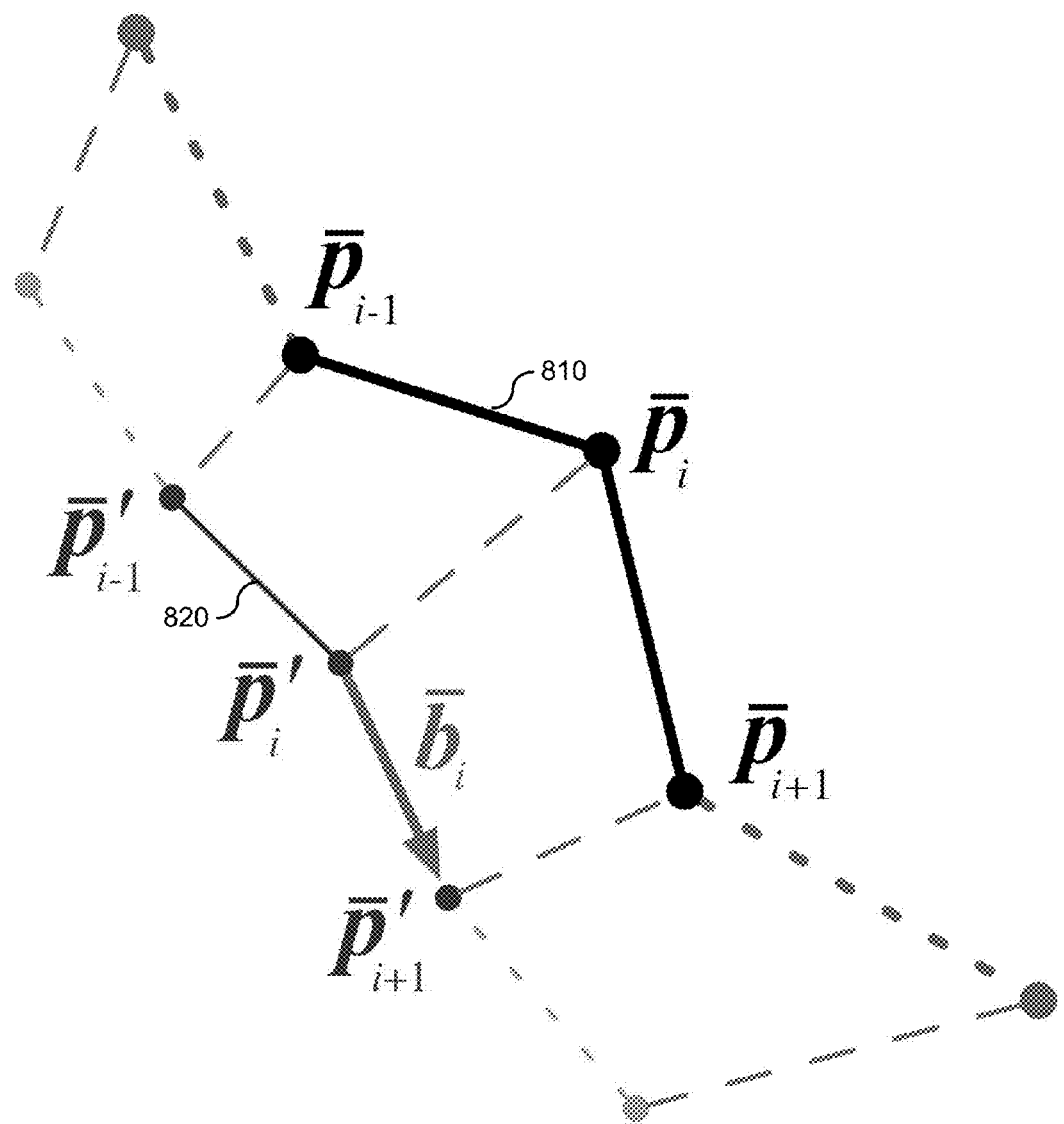
FIGS. 8A and 8B are illustrations depicting a rest curve and a posed curve in one embodiment for computing core spring forces.
Figure 8B:
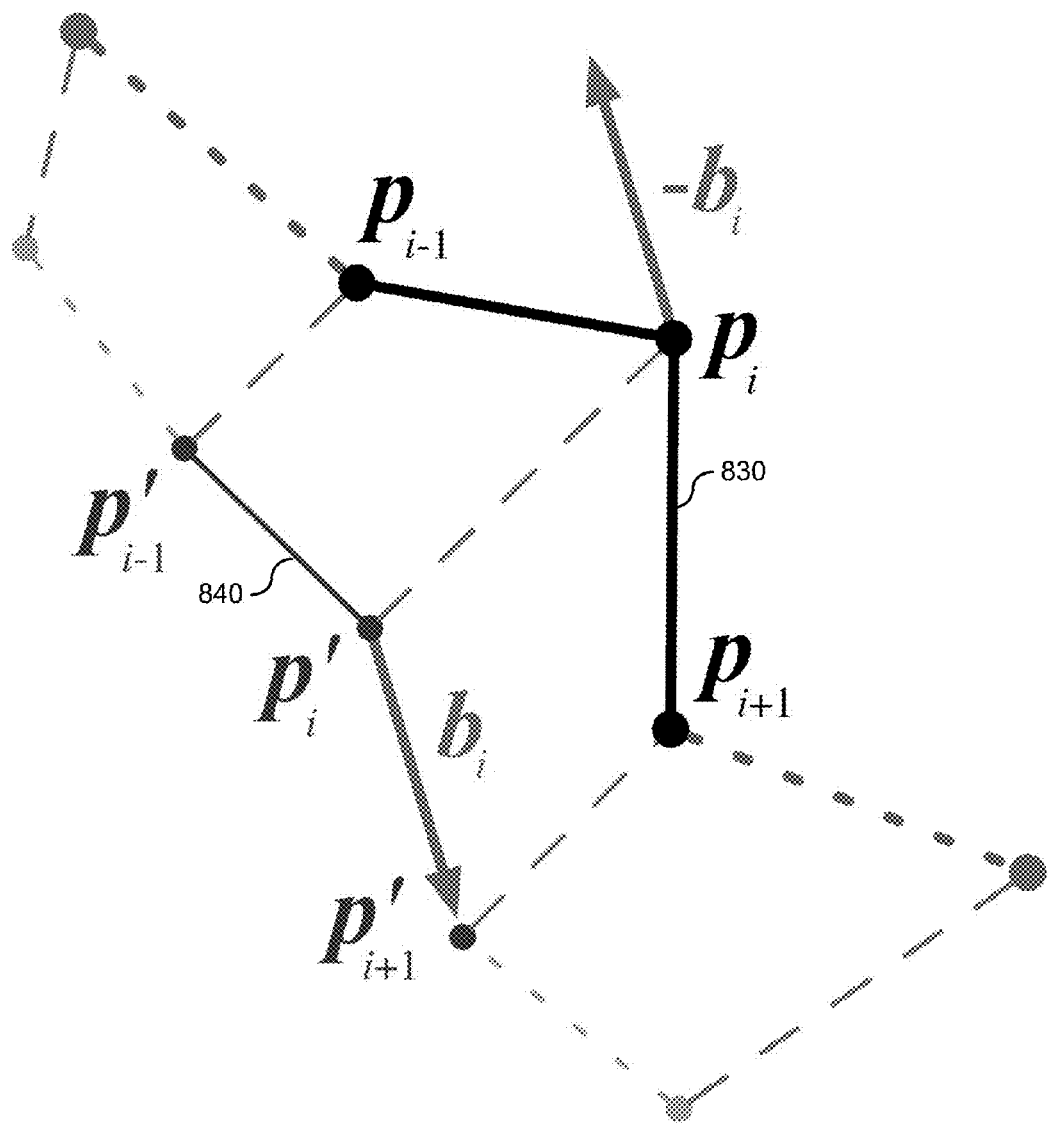

FIGS. 8A and 8B are illustrations depicting rest curve 810 and posed curve 830 in one embodiment for computing core spring forces. Similar to the torsion calculation, a smoothed representation of the hair is created. The representation of the original core of the curl can be precomputed from the rest points of smoothed curve 820 as $\bar{b}_i = \zeta(\bar{P},\alpha_c)_i$, where $\alpha_c$ is the smoothing amount for core springs. The resulting piecewise linear curve represents the direction of the center of the curl, giving a more natural representation to control its longitudinal stretch.

In FIG. 8B, during the force calculation, smoothed curve 830 is used to compute $b_i = \zeta(P,\alpha_c)_i$. The same smoothing is applied to the velocities to obtain the vectors $v_i = \zeta(V,\alpha_c)_i$ for the spring damping term. The core spring force is computed by calculating the amount of stretch along the core, giving the force of equation (5):

$$f_c(k_c,c_c)_i = k_c(\|b_i\| - \|\bar{b}_i\|)\hat{b}_i + c_c(v_i \cdot \hat{b}_i)\hat{b}_i \quad (5)$$

where $k_c$ is the spring and $c_c$ the damping coefficients. To maintain stability, $k_c < k_s$ can be preserved where $k_s$ is the spring coefficient maintaining the connection between hair particles from equation (1).

Because this spring is intended to control longitudinal stretching, unnecessary constraints can be avoided to allow the core to compress. The spring coefficient $k_c$ can be set to zero during compression, determined from the spring length ($\|b_i\| - \|\bar{b}_i\|$). Blending from zero to its full value upon extension can avoid a large force introduction. In one example, using a cubic Hermite blend function from [0; 0:5] is sufficient when the segments of the hair lengths are on the order of 1 unit of length.

In various embodiments, the core spring force is applied in the posed curve 840 in the opposite direction from that determined using smoothed curve 820.

Hair-Hair Contacts

In addition to modeling a single hair, hair-hair contacts can be modeled so that the interesting interactions are captured when simulating a mass of hair. If every possible pair of particles for interaction is considered, an algorithm would become quite expensive. Instead, the number of considered interactions is reduced by performing one or more kinds of pruning, enabling system 100 to parallelize a hair simulation and improve performance.

In various embodiments, contact points are pruned along a hair as described further below. Additionally, hair pairs allowed to interact during the simulation may be pruned. At initialization, a hair contact graph C can be built containing an edge $C(h_i, h_j)$ between every pair of hairs. Hair pair pruning then removes edges from the graph as described further below. This pruning enables system 100 to parallelize a simulation and optimize the communication pattern between processors.

In alternative embodiments, a bounding hierarchy may be used to accurately handle contacts in all situations. However, hair pruning provides advantages over such hierarchies in that the processor communication pattern can be statistically computed rather than dynamically updating the processor communication or exchanging all hair data between processors. If contacts are incorrect in certain situations, such as when long hair is flipped from one side of the scalp to the other, pruning can be modified (e.g., decreased) to better guarantee the correct contacts.

Pruning Hair Particles

In various embodiments, a hair-hair contact model is provided that accounts for volume between guide hairs, where each representing several rendered hairs. In one example, spheres may be used around individual hair particles to indicate the volume of each particle represents. Increasing these sphere radii increases the volume of the hair. Because spheres of neighboring particles on the same hair overlap, the number of particles used for contact testing can be reduced by pruning those contained inside neighboring spheres. Even with hair motion, the spheres around neighboring particles will provide enough contact for hair-hair interactions.

Figure 9A:
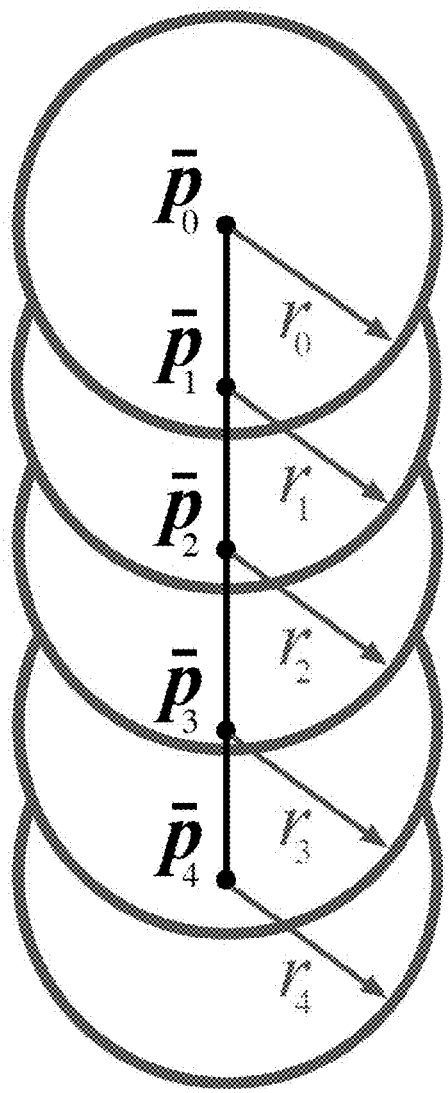
FIGS. 9A and 9B are illustrations depicting pruning of hair particles in one embodiment.
Figure 9B:
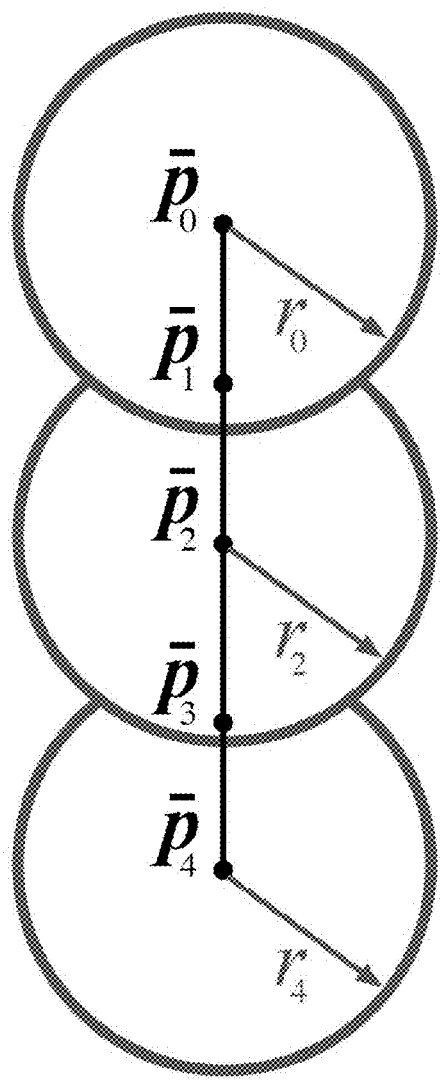

FIGS. 9A and 9B are illustrations depicting pruning of hair particles in one embodiment. In this example, each particle $\bar{p}_i$ has an associated sphere with radius r Particles contained in overlapping spheres are pruned to reduce the number of potential contacts.

In one embodiment, a pruning test starts at the root of the hair (j=0), which is typically never pruned, and compares the sum of the edges $\bar{e}_i$ to the potentially overlapping spheres. If k=1 and system 100 continues to increment k until the equation (6) is satisfied:

$$\sum_{i=j}^{k-1} \|\bar{e}_i\| > s(r_j + r_k) \quad (6)$$

where $r_j$ is the radius for the $j^{th}$ particle and s a parameter controlling particle sparsity. All particles between j and k are then pruned, with j=k, k=k+1 and the process can be repeated until reaching a predetermined point, such as the end of the hair. This process controls how much overlap there is between the contact spheres after pruning Setting s=1 means that spheres would just touch with no overlapping. In experiments, a value of 0:75 provides a good balance between performance and accuracy. The result is a subset of available particles for handling contacts.

Pruning Hair Pairs

Figure 10:
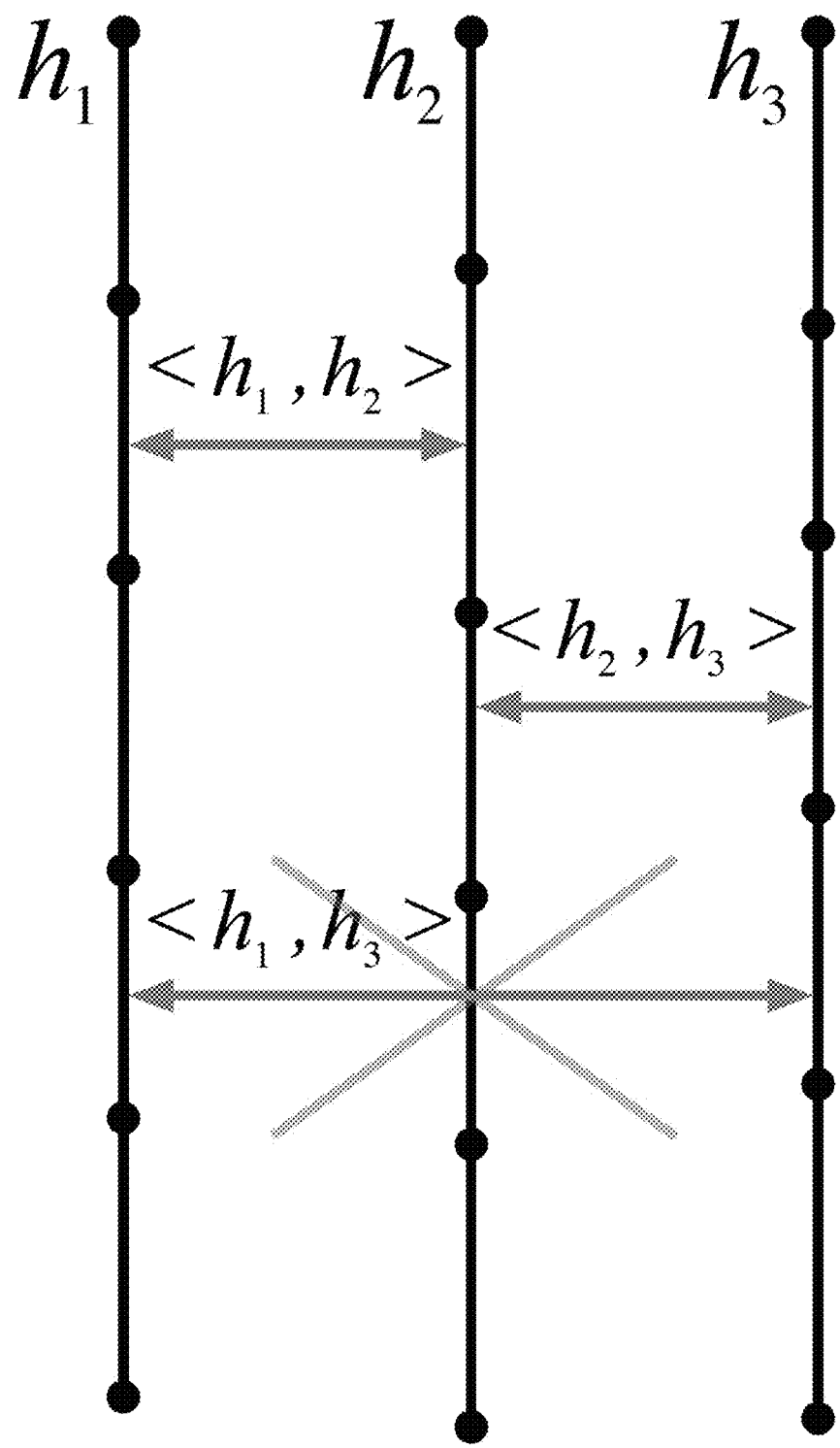
FIG. 10 is an illustration of three hairs $h_1$, $h_2$ and $h_3$ that are aligned in a row.

In further embodiments, hair-hair contact models are provided to represent forces such as static charge and friction among neighboring hairs. It has been observed that when many hairs interact in a complex manner, it is not necessary to capture all of the individual hair-hair interactions in order to produce a plausible, visually appealing result. In fact, certain hair-hair interactions can be ignored and their effect will often be felt through similar or indirect interactions with neighboring hairs. For example, FIG. 10 is an illustration of three hairs $h_1$, $h_2$ and $h_3$ that are aligned in a row. The interaction $<h_1, h_3>$ can be pruned assuming that the effect of this interaction will happen through contacts between $<h_1, h_2>$ and $<h_2, h_3>$. As the numbers of hairs increase, the effects of these individual hair-hair interaction become less important as we mainly see the aggregate effects of many hair-hair interactions. Using this observation, an algorithm is provided to prune hair pairs used for contact testing—effectively sampling the hair-hair interactions. This pruning allows system 100 to reduce the number of necessary hair-hair contacts, reduce interprocessor communication and more efficiently parallelize a simulation.

To indicate the hairs allowed to interact during simulation, a graph C is created where each node is a hair and an edge $C(h_i, h_j)$ indicates that hairs $h_i$ and $h_j$ are allowed to interact. The contact graph can be statically pruned at initialization time as follows:

First, each $r_i$ is multiplied by a constant, $r_c$, and the sum all contacts is computer between spheres on hair i and hair j, calling the sum $n_{i,j}$. Edges are pruned where $n_{i,j}<n_t$, a threshold indicating the minimum number of hair contacts required for interaction. Graph edges are also stochastically pruned based on an observation that neighboring hairs will handle the interactions. It is important to note that hair-hair interactions are pruned from the graph, not the hairs themselves.

Figure 11:
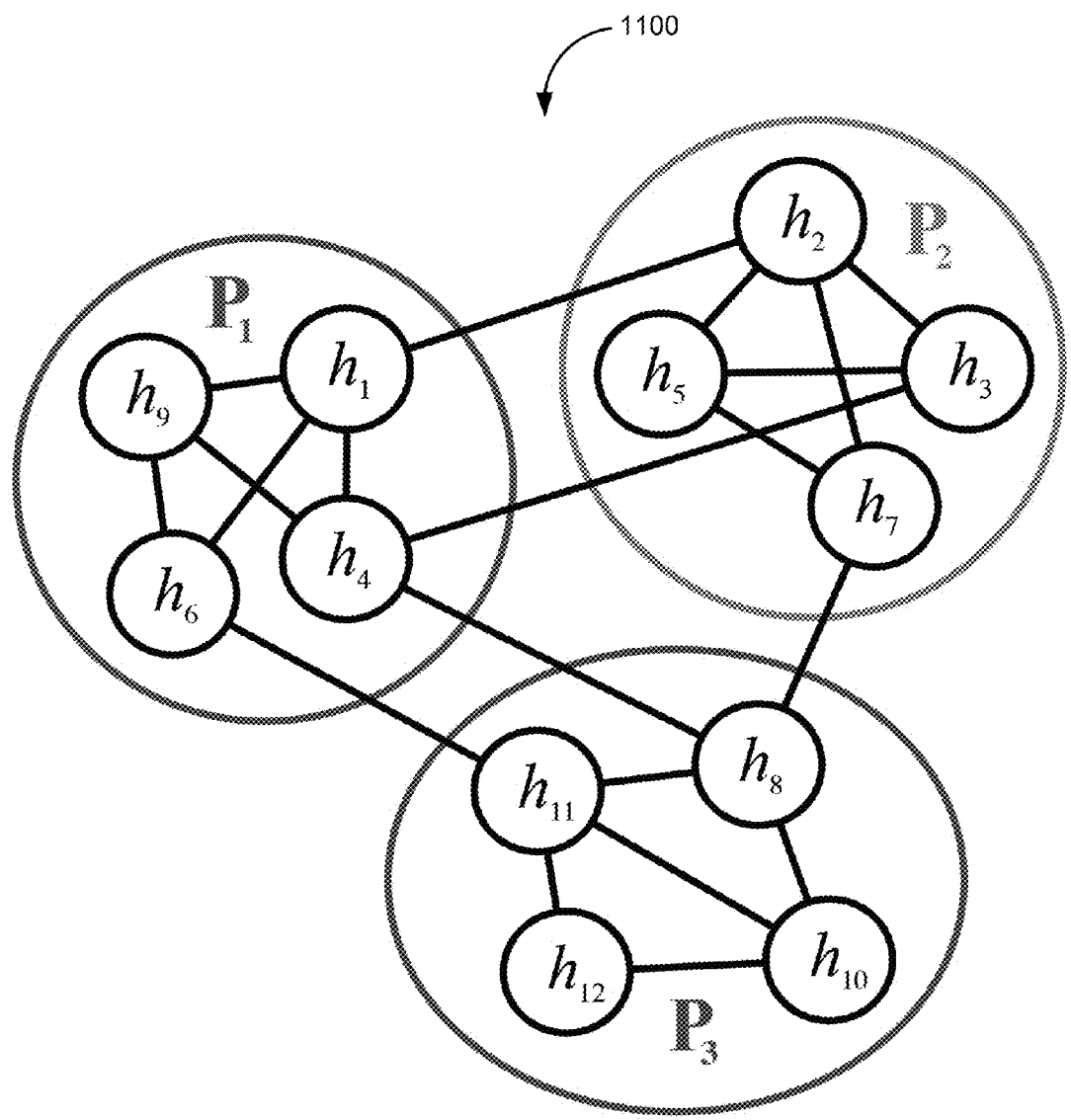
FIG. 11 is a graph depicting hairs assigned to processors with reduced communication costs.

Once the graph has been pruned as above, hairs can be assigned to processors for parallelization. To optimize performance, the data exchanged between processors is reduced or otherwise minimized by using a greedy graph clustering algorithm. For example, equal numbers of hairs may be assigned to each processor, creating a graph clustering. One goal then is to reduce the communication cost, computed as the number of edges between the processor groups, while maintaining equal workloads. To do so, hairs may be swapped in a greedy manner between processors if it reduces the communication cost. This can be iterated until a minimum is reached, or until a maximum number of swaps is exceeded. FIG. 11 is a graph depicting hairs assigned to processors with reduced communication costs. This final clustering allows system 100 to send less information between processors than if system 100 had simply used all contact pairs, leading to more efficient parallelization. It will be understood that any algorithm for constructing the hair adjacency graph may be used as long as it produces good communication patterns between processors.

Contact Detection and Response

In another aspect, at each step of a simulation, a scene can be spatially subdivided into a uniform grid structure. The hair particles available for contact can then be inserted into the grid. For each hair particle, the grid is used to retrieve neighboring hair particles for contact testing. Potential contacts can be discarded prior to testing if their is no hair pair edge $C(h_i, h_j)$ between the hairs containing the particles.

If the hair pair $<hi, h_j>$ has not been discarded, contacts can be detected when their spheres overlap, $\|p_i-p_j\|<r_i+r_j$. Similar to prior methods [Chang et al. 2002; Bando et al. 2003; Selle et al. 2008], interactions can be handled by applying a spring penalty force and contacts are broken when particles surpass a distance threshold. Contacts then can be dynamically created, similar to [Selle et al. 2008].

One difference is that springs are attached between particles instead of edges and the overall number of allowed contacts is not directly limited. Instead, contacts are limited through pruning particles and hair pairs.

In a further aspect, spring constants are adjusted when a spring breaks, similar to [Chang et al. 2002] but with some additions. The spring stiffness is dynamically increased during initial contact while using full damping to avoid a large spring impulse. As the spring breaks, the stiffness is first decreased to zero followed by the damping. The spring constants are allowed to reengage if the particle's distance decreases before the spring breaks, so that the contacts do not pass through one another.

Implementation

The above algorithm can be summarized in one embodiment as:

For each timestep:
    Integrate Internal Hair Forces
    Integrate External Forces
    Handle Hair-Hair and Hair-Object Collisions
    Update Positions
    Exchange Hair Data Between Processors In this implementation, the force equations can be semo-implicitly integrated and MPI used for inter-processor communication.

For hair-object collision detection, the scene is spacially subdivided as discussed above into a uniform grid using a method similar to [Teschner et al. 2003]. Simulator can use penalty forces for collision response, a commonly used approach [Plante et al. 2002; Choe et al. 2005; Bertails et al. 2006; McAdams et al. 2009] that is fast to compute. However, the above algorithm does not rely on which collision model is used and an alternative method could be substituted.

Experimental Results

In various tests, a simulator is used by a feature film with a variety of characters and hair styles. By creating a stable simulator, most simulations are generated using default character parameters (examples of the default parameters for Model_1 and Model_2 characters are given in FIG. 12). Eliminating per-shot parameter tweaking provides a dramatic benefit to production schedules and can have a great impact on the production budget. Although many of the shots are "out of the box", the simulator provides additional controls and supports external forces for artistic direction (a common use is to keep the characters' hair from blocking their face).

With regard to the effects of torsion smoothing, the above smoothed hair for torsion frame propagation on a simple, single hair example, provides that with no smoothing or too little smoothing, the hair appears very sensitive to small changes resulting in a jittery look. Although these instabilities are present in a physically accurate elastic rod, they are undesirable in artistic settings. The physically inaccuracy of a smoothed torsion model is more likely to be chosen specifically to remove such instabilities.

With regard to the effects of core springs, even in a simple walk cycle, without core springs hair can sag unnaturally. This sag can be removed by increasing the torsion springs, but this results in an unnaturally stiff looking hair style. Core springs allow system 100 to maintain the curl shape without making the hair unnecessarily stiff The need for core springs is even greater during fast motions and high accelerations. Without core springs, when the character stops abruptly, the high acceleration causes the curls to unwind. It is important to note that the length of the hair segments themselves are not extending much here, rather the curls are unwinding, resulting in a visually longer hair. Using core springs, the curls maintain the shape much better. These extreme accelerations are not uncommon when dealing with animated films.

Figure 14:
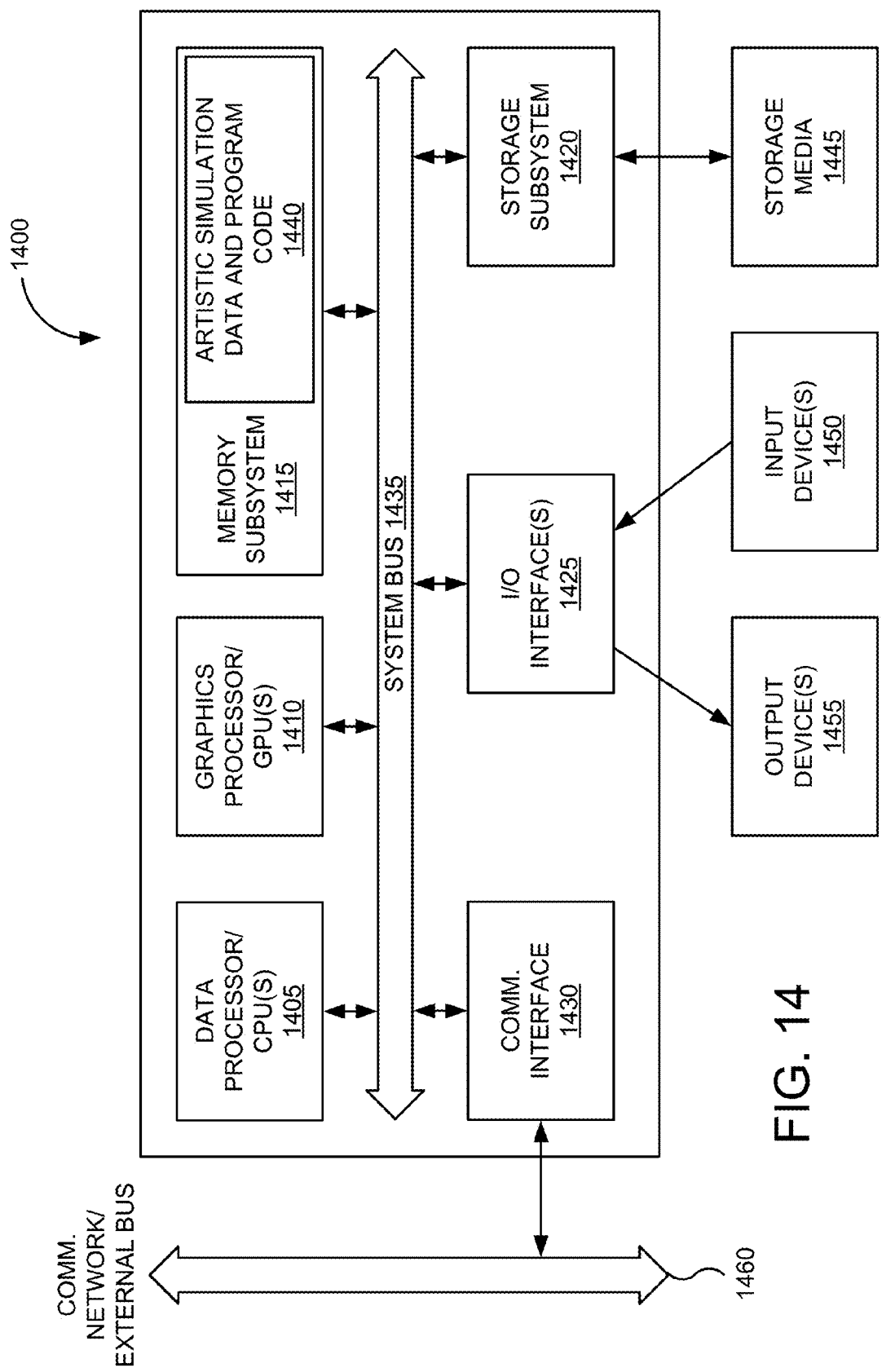
FIG. 14 is a block diagram of a computer system or information processing device that may incorporate an embodiment, be incorporated into an embodiment, or be used to practice any of the innovations, embodiments, and/or examples found within this disclosure.

FIG. 14 is a table showing the average seconds per frame for different simulations using system 100. Notice that system 100 achieves good speedups as the number of processors is increased (from around 4.5×-6× on 10 processors). For some examples, the performance gains reduce or even become negative around 12 processors. This is due to the communication cost beginning to exceed the gains of using more cores—usually because there are not enough hair points on each processor. Communication costs are even more dominant if we do not use the above hair-hair contact pruning. When not using the pruning, performance drops by a factor of 1.4×-4.1× depending on the example. With simulation times of 13.4 seconds per frame for our Model_1 character and the complex hair, the simulator has proved to be extremely efficient in a production process.

Although the simulator can be designed to handle the challenges of curly hair, it is more than capable of simulating other styles.

Conclusion

In one aspect, system 100 provides efficient simulation of curly hair while being able to realize one or more artistic goals. This can be achieved through several contributions, such as a smoothed torsion formulation that produces visually pleasing bend and twist while removing the twist discontinuities present in physical rods. A nonlinear core spring force can be provided that resists unwinding and maintains curl shape, without making the hair unnecessarily stiff, even during extreme motion. In a further aspect, hair-hair contact pruning allows system 100 to efficiently parallelize the simulation by reducing the interprocessor communications while still achieving plausible dynamics. Thus, system 100 can be used on a full-length feature film on a range of characters and hair styles.

In all but a few extreme cases (such as when a character flips all of the hair from one side of their head to another), artifacts from missed hair-hair contacts are rare as the effect of these contacts are usually handled by one of the contact pairs that have not been pruned. In the cases where pruning will cause a problem (such as the aforementioned hair flip), pruning controls can be used to easily reduce the amount of pruning, trading speed for accuracy.

Hardware

FIG. 14 is a block diagram of computer system 1400 that may incorporate an embodiment, be incorporated into an embodiment, or be used to practice any of the innovations, embodiments, and/or examples found within this disclosure. FIG. 14 is merely illustrative of a computing device, general-purpose computer system programmed according to one or more disclosed techniques, or specific information processing device for an embodiment incorporating an invention whose teachings may be presented herein and does not limit the scope of the invention as recited in the claims One of ordinary skill in the art would recognize other variations, modifications, and alternatives.

Computer system 1400 can include hardware and/or software elements configured for performing logic operations and calculations, input/output operations, machine communications, or the like. Computer system 1400 may include familiar computer components, such as one or more one or more data processors or central processing units (CPUs) 1405, one or more graphics processors or graphical processing units (GPUs) 1410, memory subsystem 1415, storage subsystem 1420, one or more input/output (I/O) interfaces 1425, communications interface 1430, or the like. Computer system 1400 can include system bus 1435 interconnecting the above components and providing functionality, such connectivity and inter-device communication. Computer system 1400 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 1405 can include hardware and/or software elements configured for executing logic or program code or for providing application-specific functionality. Some examples of CPU(s) 1405 can include one or more microprocessors (e.g., single core and multi-core) or micro-controllers. CPUs 1405 may include 4-bit, 8-bit, 14-bit, 16-bit, 32-bit, 64-bit, or the like architectures with similar or divergent internal and external instruction and data designs. CPUs 1405 may further include a single core or multiple cores. Commercially available processors may include those provided by Intel of Santa Clara, Calif. (e.g., x86®, x86 64®, PENTIUM®, CELERON®, CORE®, CORE 2®, CORE ix®, ITANIUM®, XEON®, etc.), by Advanced Micro Devices of Sunnyvale, Calif. (e.g., x86®, AMD 64®, ATHLON®, DURON®, TURION®, ATHLON XP/64®, OPTERON®, PHENOM®, etc). Commercially available processors may further include those conforming to the Advanced RISC Machine (ARM) architecture (e.g., ARMv7-9), POWER and POWERPC® architecture, CELL® architecture, and or the like. CPU(s) 1405 may also include one or more field-gate programmable arrays (FPGAs), application-specific integrated circuits (ASICs), or other microcontrollers. The one or more data processors or central processing units (CPUs) 1405 may include any number of registers, logic units, arithmetic units, caches, memory interfaces, or the like. The one or more data processors or central processing units (CPUs) 1405 may further be integrated, irremovably or moveably, into one or more motherboards or daughter boards.

The one or more graphics processor or graphical processing units (GPUs) 1410 can include hardware and/or software elements configured for executing logic or program code associated with graphics or for providing graphics-specific functionality. GPUs 1410 may include any conventional graphics processing unit, such as those provided by conventional video cards. Some examples of GPUs are commercially available from NVIDIA®, ATI®, and other vendors. In various embodiments, GPUs 1410 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1410 may include any number of registers, logic units, arithmetic units, caches, memory interfaces, or the like. The one or more data processors or central processing units (CPUs) 1405 may further be integrated, irremovably or moveably, into one or more motherboards or daughter boards that include dedicated video memories, frame buffers, or the like.

Memory subsystem 1415 can include hardware and/or software elements configured for storing information. Memory subsystem 1415 may store information using machine-readable articles, information storage devices, or computer-readable storage media. Some examples of these articles used by memory subsystem 1470 can include random access memories (RAM), read-only-memories (ROMS), volatile memories, non-volatile memories, and other semiconductor memories. In various embodiments, memory subsystem 1415 can include artistic simulation for curly hair data and program code 1440.

Storage subsystem 1420 can include hardware and/or software elements configured for storing information. Storage subsystem 1420 may store information using machine-readable articles, information storage devices, or computer-readable storage media. Storage subsystem 1420 may store information using storage media 1445. Some examples of storage media 1445 used by storage subsystem 1420 can include floppy disks, hard disks, optical storage media such as CD-ROMS, DVDs and bar codes, removable storage devices, networked storage devices, or the like. In some embodiments, all or part of artistic simulation for curly hair data and program code 1440 may be stored using storage subsystem 1420.

In various embodiments, computer system 1400 may include one or more hypervisors or operating systems, such as WINDOWS®, WINDOWS NT®, WINDOWS XP®, VISTA®, WINDOWS 7® or the like from Microsoft of Redmond, Wash., Mac OS® or Mac OS X® from Apple Inc. of Cupertino, Calif., SOLARIS® from Sun Microsystems, LINUX®, UNIX®, and other UNIX-based or UNIX-like operating systems. Computer system 1400 may also include one or more applications configured to execute, perform, or otherwise implement techniques disclosed herein. These applications may be embodied as artistic simulation for curly hair data and program code 1440. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1415 and/or storage subsystem 1420.

The one or more input/output (I/O) interfaces 1425 can include hardware and/or software elements configured for performing I/O operations. One or more input devices 1450 and/or one or more output devices 1455 may be communicatively coupled to the one or more I/O interfaces 1425.

The one or more input devices 1450 can include hardware and/or software elements configured for receiving information from one or more sources for computer system 1400. Some examples of the one or more input devices 1450 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1450 may allow a user of computer system 1400 to interact with one or more non-graphical or graphical user interfaces to enter a comment, select objects, icons, text, user interface widgets, or other user interface elements that appear on a monitor/display device via a command, a click of a button, or the like.

The one or more output devices 1455 can include hardware and/or software elements configured for outputting information to one or more destinations for computer system 1400. Some examples of the one or more output devices 1455 can include a printer, a fax, a feedback device for a mouse or joystick, external storage systems, a monitor or other display device, a communications interface appropriately configured as a transceiver, or the like. The one or more output devices 1455 may allow a user of computer system 1400 to view objects, icons, text, user interface widgets, or other user interface elements.

A display device or monitor may be used with computer system 1400 and can include hardware and/or software elements configured for displaying information. Some examples include familiar display devices, such as a television monitor, a cathode ray tube (CRT), a liquid crystal display (LCD), or the like.

Communications interface 1430 can include hardware and/or software elements configured for performing communications operations, including sending and receiving data. Some examples of communications interface 1430 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 1430 may be coupled to communications network/external bus 1480, such as a computer network, to a FireWire bus, a USB hub, or the like. In other embodiments, communications interface 1430 may be physically integrated as hardware on a motherboard or daughter board of computer system 1400, may be implemented as a software program, or the like, or may be implemented as a combination thereof In various embodiments, computer system 1400 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1400.

As suggested, FIG. 14 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

REFERENCES

BANDO, Y., CHEN, B.-Y., AND NISHITA, T. 2003 Animating hair with loosely connected particles. Computer Graphics Forum 22 (September), 411¡ V418.

BERGOU, M., WARDETZKY, M., ROBINSON, S., AUDOLY, B., AND GRINSPUN, E. 2008. Discrete elastic rods. In ACM SIGGRAPH 2008 Papers, 63:1¡ V63:12.

BERGOU, M., AUDOLY, B., VOUGA, E., WARDETZKY, M., AND GRINSPUN, E. 2010. Discrete viscous threads. In ACM SIGGRAPH 2010 papers, 116:1¡ V116:10.

BERTAILS, F., AUDOLY, B., CANI, M.-P., QUERLEUX, B., LEROY, F., AND L¡ |E V.EQUE, J.-L. 2006. Super-helices for predicting the dynamics of natural hair. In ACM SIGGRAPH 2006 Papers, 1180¡ V1187.

BERTAILS, F., HADAP, S., CANI, M.-P., LIN, M., KIM, T.-Y., MARSCHNER, S., WARD, K., AND KA£¾CI¡ |C-ALESI¡ |C, Z. 2008. Realistic hair simulation: animation and rendering. In ACM SIGGRAPH 2008 classes, SIGGRAPH ¡ |08,89:1¡ V89:154.

CHANG, J. T., JIN, J., AND YU, Y. 2002. A practical model for hair mutual interactions. In Proc. of the 2002 ACM SIGGRAPH/Eurographics symposium on Computer Animation, 73-80.

CHOE, B., CHOI, M. G., AND KO, H.-S. 2005. Simulating complex hair with robust collision handling. In Proc. of the 2005 ACM SIGGRAPH/Eurographics symposium on Computer Animation, 153-160.

GR'EGOIRE, M., AND SCHMER, E. 2006. Interactive simulation of one-dimensional flexible parts. In Proc. of the 2006 ACM symposium on Solid and Physical Modeling, 95-103.

GUPTA, R., MONTAGNOL, M., VOLINO, P., AND MAG-NENATTHALMANN, N. 2006. Optimized framework for real time hair simulation. In Proc. of Computer Graphics International (CGI'06), LNCS, 702-710.

MCADAMS, A., SELLE, A., WARD, K., SIFAKIS, E., AND TERAN, J. 2009. Detail preserving continuum simulation of straight hair. In ACM SIGGRAPH 2009 Papers, 62:1-62:6. NAJIM, M., Ed. 2006. Digital Filters Design for Signal and Image Processing. Wiley-ISTE. PAI, D. K. 2002. Strands: Interactive simulation of thin solids using cosserat models. Computer Graphics Forum 21, 3 (September), 347-352.

PETROVIC, L., HENNE, M., AND ANDERSON, J. 2005. Volumetric methods for simulation and rendering of hair. Technical Memo 06-08, Pixar Animation Studios.

PLANTE, E., CANI, M.-P., AND POULIN, P. 2002. Capturing the complexity of hair motion. Graphical Models 64,1 (January), 40-58.

ROSENBLUM, R., CARLSON, W., AND TRIPP III, E. 1991. Simulating the structure and dynamics of human hair: Modelling, rendering and animation. The Journal of Visualization and Computer Animation 2, 141-148.

SELLE, A., LENTINE, M., AND FEDKIW, R. 2008. A mass spring model for hair simulation. In ACM SIGGRAPH 2008 Papers, 64:1-64:11.

SPILLMANN, J., AND TESCHNER, M. 2007. Corde: Cosserat rod elements for the dynamic simulation of one-dimensional elastic objects. In Proc. of the 2007 ACM SIGGRAPH/Eurographics symposium on Computer Animation, 63-72.

TESCHNER, M., HEIDELBERGER, B., MUELLER, M., POMERANETS, D., AND GROSS, M. 2003. Optimized spatial hashing for collision detection of deformable objects. In Vision, Modeling and Visualization, 47-54.

WARD, K., BERTAILS, F., KIM, T.-Y., MARSCHNER, S. R., CANI, M.-P., AND LIN, M. C. 2007. A survey on hair modeling: Styling, simulation, and rendering. IEEE Transactions on Visualization and Computer Graphics 13, 2 (March), 213-234.

What is claimed is:

1. A computer-implemented method for animating curve models, the method comprising:
receiving, at one or more computer systems, a first pose associated with a curve model, the curve model having a set of parameters placed at selected locations along the curve model that influence shape of the curve model, wherein the set of parameters include a first parameter and a second parameter that define a first edge along the curve model;
receiving, at the one or more computer systems, a second pose associated with the curve model, the second pose of the curve model being different from the first pose of the curve model;
determining, at the one or more computer systems, a first pose associated with a proxy model based on the first pose of the curve model, the proxy model being a representation of the curve model
determining, at the one or more computer systems, a second pose associated with the proxy model based on the second pose of the curve model;
determining, with the one or more processors associated with the one or more computer systems, a first reference vector based on the first pose associated with the proxy model and the first edge, wherein the first reference vector represents a first torsion direction associated with the first edge;
determining, with the one or more processors associated with the one or more computer systems, a second reference vector based on the first reference vector and the second pose associated with the proxy model, wherein the second reference vector represents a target torsion direction; and
generating, with one or more processors associated with the one or more computer systems, torsion force information for the first edge based on the second reference vector, the torsion force information indicating how much the first set of parameters influence second pose of the curve model at the first edge.

2. The method of claim 1 wherein the first set of parameters that influence the shape of the curve model comprises one or more properties that represent an intrinsic bend of a model.

3. The method of claim 1 wherein the first set of parameters that influence the shape of the curve model comprises one or more properties that represent an intrinsic twist of a model.

4. The method of claim 1 wherein the first set of parameters that influence the shape of the curve model one or more properties that controls longitudinal stretch of a model.

5. The method of claim 1 further comprising:
obtaining a first local frame of the first pose associated with the proxy model; and
encoding the first reference vector in the first local frame of the first pose associated with the proxy model.

6. The method of claim 1 further comprising:
encoding a set of edges associated with the first pose of the curve model in a set of local frames associated with the first pose of the proxy model; and
transferring the set of edges to a set of local frames associated with the second pose of the proxy model.

7. The method of claim 1 further comprising:
encoding a representation of longitudinal stretch associated with the first pose of the curve model in a set of local frames associated with the first pose of the proxy model; and
transferring the representation of longitudinal stretch to a set of local frames associated with the second pose of the proxy model.

8. The method of claim 1 further comprising transferring, with the one or more processors associated with the one or more computer systems in the set of one or more computer systems, each parameter in the first set of parameters from the first pose of the curve model to the second pose of the curve model.

9. The method of claim 1 wherein the proxy model represents a filtered version of the curve model.

10. The method of claim 1 wherein each pose of the proxy model represents a smoothed version of each pose of the curve model.

11. The method of claim 1 wherein the curve model comprises a 1-D model of a string object, a hair object, a tail object, or a vine object.

12. The method of claim 1 wherein the curve model comprises a dynamic or simulation curve model.

13. The method of claim 1, wherein determining the first reference vector using the first pose associated with the proxy model comprises:
    generating a first root frame at a root of the first pose associated with the proxy model; and
    obtaining a first local frame for the first pose associated with the proxy model by parallel transporting the first root frame along the first pose associated with the proxy model.

14. A non-transitory computer-readable medium storing computer-executable code for animating curve models, the non-transitory computer-readable medium comprising:
    code for a first pose associated with a curve model, the curve model having a set of parameters placed at selected locations along the curve model that influence shape of the curve model, wherein the set of parameters include a first parameter and a second parameter that define a first edge along the curve model;
    code for receiving a second pose associated with the curve model, the second pose of the curve model being different from the first pose of the curve model;
    code for determining a first pose associated with a proxy model based on the first pose of the curve model, the proxy model being a representation of the curve model;
    code for determining a second pose associated with a proxy model based on the second pose of the curve model, the second pose of the proxy model being different from the first pose of the curve model;
    code for determining a first reference vector based on the first pose associated with the proxy model and the first edge, wherein the first reference vector represents a first torsion direction associated with the first edge;
    code for determining a second reference vector based on the first reference vector and the second pose associated with the proxy model, wherein the second reference vector represents a target torsion direction; and
    code for generating torsion force information for the first edge based on the second reference vector, the torsion force information indicating how much the first set of parameters influence second pose of the curve model at the first edge.

15. The non-transitory computer-readable medium of claim 14 wherein the first set of parameters that influence the shape of the curve model comprises one or more properties that represent an intrinsic bend of a model, an intrinsic twist of a model, or longitudinal stretch of a model.

16. The non-transitory computer-readable medium of claim 14 wherein the code for determining the difference between the first and second poses associated with the proxy model comprises code for determining a difference between local frames encoding reference vectors determined from the first pose associated with the curve model.

17. The non-transitory computer-readable medium of claim 14 further comprising:
    code for encoding a set of edges associated with the first pose of the curve model in a set of local frames associated with the first pose of the proxy model; and
    code for transferring the set of edges to a set of local frames associated with the second pose of the proxy model.

18. The non-transitory computer-readable medium of claim 14 further comprising:
    code for encoding a representation of longitudinal stretch associated with the first pose of the curve model in a set of local frames associated with the first pose of the proxy model; and
    code for transferring the representation of longitudinal stretch to a set of local frames associated with the second pose of the proxy model.

19. A system for animating curve models, the system comprising:
    a processor; and
    a memory in communication with the processor and storing a set of instructions which when executed by the processor configure the processor to:
        receive a first pose associated with a curve model, the curve model having a set of parameters placed at selected locations along the curve model that influence shape of the curve model, wherein the set of parameters include a first parameter and a second parameter that define a first edge along the curve model;
        receive a second pose associated with the curve model, the second pose of the curve model being different from the first pose of the curve model;
        determine a first pose associated with a proxy model based on the first pose of the curve model, the proxy model being a representation of the curve model;
        determine a second pose associated with the proxy model based on the second pose of the curve model, the second pose of the proxy model being different from the first pose of the curve model;
        determine a first reference vector based on the first pose associated with the proxy model and the first edge, wherein the first reference vector represents a first torsion direction associated with the first edge;
        determine, a second reference vector based on the first reference vector and the second pose associated with the proxy model, wherein the second reference vector represents a target torsion direction; and
    generate torsion force information for the first edge based on the second reference vector, the torsion force information indicating how much the first set of parameters influence second pose of the curve model at the first edge.

* * * * *